(12) United States Patent
Kadambi et al.

(10) Patent No.: US 9,897,699 B2
(45) Date of Patent: Feb. 20, 2018

(54) METHODS AND APPARATUS FOR VIRTUAL SENSOR ARRAY

(71) Applicants: Achuta Kadambi, Cambridge, MA (US); Hang Zhao, Cambridge, MA (US); Boxin Shi, Singapore (SG); Ayush Bhandari, Cambridge, MA (US); Ramesh Raskar, Cambridge, MA (US)

(72) Inventors: Achuta Kadambi, Cambridge, MA (US); Hang Zhao, Cambridge, MA (US); Boxin Shi, Singapore (SG); Ayush Bhandari, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 353 days.

(21) Appl. No.: 14/795,113

(22) Filed: Jul. 9, 2015

(65) Prior Publication Data
US 2016/0014393 A1    Jan. 14, 2016

Related U.S. Application Data

(60) Provisional application No. 62/022,640, filed on Jul. 9, 2014.

(51) Int. Cl.
*G01C 3/08* (2006.01)
*G01S 17/89* (2006.01)
(Continued)

(52) U.S. Cl.
CPC ............ *G01S 17/89* (2013.01); *G01S 17/003* (2013.01); *G01S 17/46* (2013.01)

(58) Field of Classification Search
CPC ......... G01S 17/89; G01S 17/003; G01S 17/46
(Continued)

(56) References Cited

U.S. PATENT DOCUMENTS 8,355,117 B2 * 1/2013 Niclass .................... G01C 3/08
356/3.01
9,194,953 B2 * 11/2015 Schmidt .................. G01S 17/89
(Continued)

OTHER PUBLICATIONS

Boufounos, P. et al., Joint sparsity models for wideband array processing; Proc. SPIE 8138, Wavelets and Sparsity XIV, 81380K (Sep. 27, 2011); doi:10.1117/12.893870.
(Continued)

*Primary Examiner* — Mark Hellner
(74) *Attorney, Agent, or Firm* — Stephen R. Otis

(57) ABSTRACT

A time-of-flight camera images an object around a corner or through a diffuser. In the case of imaging around a corner, light from a hidden target object reflects off a diffuse surface and travels to the camera. Points on the diffuse surface function as a virtual sensors. In the case of imaging through a diffuser, light from the target object is transmitted through a diffusive media and travels to the camera. Points on a surface of the diffuse media that is visible to the camera function as virtual sensors. In both cases, a computer represents phase and intensity measurements taken by the camera as a system of linear equations and solves a linear inverse problem to (i) recover an image of the target object; or (ii) to compute a 3D position for each point in a set of points on an exterior surface of the target object.

20 Claims, 10 Drawing Sheets

(51) Int. Cl.
*G01S 17/00* (2006.01)
*G01S 17/46* (2006.01)

(58) Field of Classification Search
USPC .......................................................... 356/5.01
See application file for complete search history.

(56) References Cited

U.S. PATENT DOCUMENTS

| | | | | |
|---|---|---|---|---|
| 2007/0182949 | A1* | 8/2007 | Niclass | G01C 3/08 356/3 |
| 2011/0018967 | A1* | 1/2011 | Mirbach | G01S 7/497 348/46 |
| 2013/0100250 | A1* | 4/2013 | Raskar | H04N 13/02 348/46 |
| 2014/0327741 | A1* | 11/2014 | Fleischmann | G01S 17/89 348/46 |

OTHER PUBLICATIONS

Carter, C., Time delay estimation for passive sonar signal processing; IEEE Transactions on Acoustics, Speech and Signal Processing, vol. 29, Issue 3, pp. 463-470, Jun. 1981.

Chen, S. et al., Atomic Decomposition by Basis Pursuit; SIAM Review, vol. 43 Issue 1, pp. 129-159 Society for Industrial and Applied Mathematics, Philadelphia, PA, USA, 2001.

Ekanadham, C. et al., Oct. 2011, Recovery of sparse translation-invariant signals with continuous basis pursuit; IEEE Trans. Signal Process, vol. 59, No. 10.

Hedge, C., et al., 2014, Approximation-Tolerant Model-Based Compressive Sensing; Proceedings of the Twenty-Fifth Annual ACM-SIAM Symposium on Discrete Algorithm, SIAM, pp. 1544-1561.

Heide, F. et al., Low-budget transient imaging using photonic mixer devices; ACM Transactions on Graphics (TOG)—SIGGRAPH 2013 Conference Proceedings, vol. 32 Issue 4, Article No. 45, ACM New York, NY, USA, Jul. 2013.

Heide, F., et al., Diffuse Mirrors: 3D Reconstruction from Diffuse Indirect Illumination Using Inexpensive Time-of-Flight Sensors; 2014 IEEE Conference on Computer Vision and Pattern Recognition (CVPR), pp. 3222-3229, Jun. 2014.

Kadambi, A., et al., Coded time of flight cameras: sparse deconvolution to address multipath interference and recover time profiles; ACM Transactions on Graphics (TOG)—Proceedings of ACM SIGGRAPH Asia 2013, vol. 32 Issue 6, Article No. 167, ACM New York, NY, USA, Nov. 2013.

Malioutov, D., et al., A sparse signal reconstruction perspective for source localization with sensor arrays; IEEE Transactions on Signal Processing, vol. 53, Issue 8, pp. 3010-3022, Aug. 2005.

Naik, N., et al., Single view reflectance capture using multiplexed scattering and time-of-flight imaging; Proceedings of the 2011 SIGGRAPH Asia Conference, Article No. 171, ACM New York, NY, USA, 2011.

Reshetouski, I., et al., 2011, Three-Dimensional Kaleidoscopic Imaging; 2011 IEEE Conference on Computer Vision and Pattern Recognition (CVPR), pp. 353-360.

Reshetouski, I., et al., Mirrors in Computer Graphics; published in Time-of-Flight and Depth Imaging. Sensors, Algorithms, and Applications, vol. 8200 of the series Lecture Notes in Computer Science pp. 77-104, Springer 2013.

Tibsirani, R., 1996, Regression Shrinkage and Selection Via the Lasso; Journal of the Royal Statistical Society, Series B (Methodological), vol. 58, Issue 1, pp. 267-288.

Velten, A., et al., Recovering three-dimensional shape around a corner using ultrafast time-of-flight imaging; Nature Communications, 3:745, Mar. 2012.

* cited by examiner

METHODS AND APPARATUS FOR VIRTUAL SENSOR ARRAY

RELATED APPLICATIONS

This application is a non-provisional of, and claims the benefit of the filing date of, U.S. Provisional Patent Application No. 62/022,640, filed Jul. 9, 2014, the entire disclosure of which is herein incorporated by reference.

FIELD OF TECHNOLOGY

The present invention relates generally to time-of-flight imaging.

SUMMARY

In illustrative implementations of this invention, an imaging system images an object around a corner or through a diffuser. In the imaging system, points on a reflective wall or on a surface of a diffusive media function as virtual sensors.

In the case of imaging around a corner, a target object being imaged is hidden—that is, occluded—from direct line-of-sight of a time-of-flight camera. Light from the target object reflects off a diffusely reflective surface (e.g., a wall) and travels to the time-of-flight ("ToF") camera. Points on the diffusely reflective surface function as a virtual sensors in the imaging system.

In the case of imaging through a diffuser, light from the target object is transmitted through a diffusive media and travels to a ToF camera. The diffusive media scatters light. For example, in some cases, the diffusive media comprises (a) a solid diffuser, (b) a translucent liquid (such as an emulsion or other colloid) in a transparent or translucent container, or (c) a fog, vapor or other light-scattering aerosol or gas in a transparent or translucent container. A surface of the diffusive media is in direct line-of-sight of the ToF camera. Points on this surface function as virtual sensors in the imaging system.

A computer performs an algorithm that takes as input phase and intensity measurements at each pixel of the time-of-flight camera, and that reconstructs an image of the target object.

In the case of imaging around a corner, performance of the imaging system depends on at least two factors: camera modulation frequency and the width of the specular lobe ("shininess") of the wall. For purely Lambertian walls, time-of-flight sensors achieve resolution on the order of meters between targets. For diffusely reflective (but not purely Lambertian) surfaces, such as posterboard, the resolution is drastically improved, to the order of ten centimeters. The relationship between reflectance and resolution is nonlinear: in some implementations, a slight amount of shininess leads to a dramatic improvement in resolution. This is highly advantageous, since many ordinary scenes exhibit a slight amount of shininess.

In both cases (imaging around a corner and through a diffuser), the camera modulation frequency has an approximately linear relationship with resolution.

In illustrative implementations, the imaging system reconstructs the position of moving target objects in real-time.

The imaging system measures phase and amplitude at each pixel of a time-of-flight camera, and uses these measurements for recovery of an image of a target object that is around a corner or seen through a diffuser.

In illustrative implementations involving imaging an object around a corner or through a diffuse media, a computer represents measurements taken by the time-of-flight camera as a system of simultaneous linear equations. For example, in some cases, this system of simultaneous linear equations is represented by a matrix. In illustrative implementations, a computer performs an algorithm that takes this system of simultaneous linear equations as an input and solves a linear inverse problem to (i) recover an image of an occluded target object; or (ii) to compute a 3D position for each point in a set of points on an exterior surface of the target object. The occluded object is viewable, from the camera's vantage point, only around a corner or through a diffuse media. Solving the linear inverse problem comprises solving the system of linear equations. A wide range of algorithms may be used to solve the system of linear equations. For example, in some implementations, a computer uses a beamforming, pseudoinverse, CoSaMP, or basis pursuit denoising algorithm in order to solve the system of linear equations. In some implementations, a computer performs an algorithm that solves a linear inverse problem by solving Equation 17 or Equation 18, below.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a field of technology to which exemplary implementations of this invention generally relate. Likewise, the Title of this document does not limit the invention in any way; instead the Title is merely a general, non-exclusive way of referring to this invention. This invention may be implemented in many other ways.

The above Figures show some illustrative implementations of this invention, or provide information that relates to those implementations. However, this invention may be implemented in many other ways.

DETAILED DESCRIPTION

In illustrative implementations, a phase based time-of-flight (ToF) range camera images around corners and through scattering diffusers.

As used herein, to say that a camera images "around a corner" means that the camera captures an image of a target object that is occluded by an occluder, such that the target object is not in the direct line of sight of the camera. In other words, light cannot travel in a straight line from the target object to the camera. As used herein, the "corner problem" means the problem of how to image around a corner with a camera. In illustrative implementations involving imaging around a corner, light from the target object reflects off a diffusely reflective surface and then travels to the camera.

Figure 1:
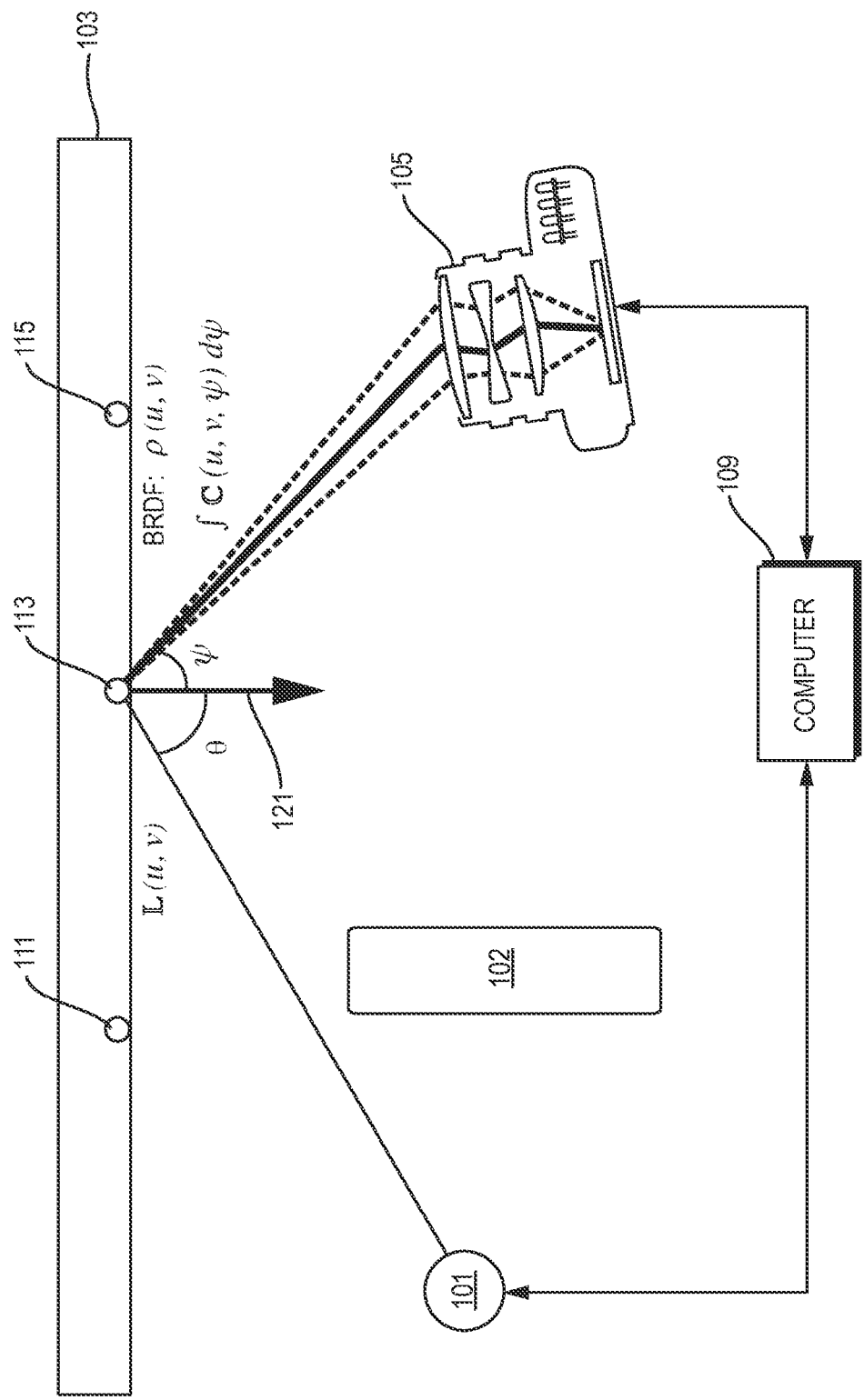
FIG. 1 is a conceptual diagram that shows a virtual sensor array for imaging around a corner.

FIG. 1 is a conceptual diagram that shows a virtual sensor array for imaging around a corner, in an illustrative implementation of this invention. A light source 101 emits AMCW (amplitude-modulated continuous-wave) light. In the example shown in FIG. 1, an occluder 102 occludes the light source 101, such that light source 101 is not in direct line-of-sight from the vantage points of the light source 101 and a time-of-flight camera 105. The light from light source 101 travels to a diffusely reflective surface 103 (e.g., a wall). The time-of-flight camera 105 takes measurements of light that has traveled from the light source 101 to the surface 103, then reflected from the surface 103, and then traveled to the camera 105.

In the example shown in FIG. 1, the surface 103 functions as a 2D array of virtual sensors (e.g., virtual sensors 111, 113, 115).

In the example shown in FIG. 1: (a) transport of light from the light source 101 to a point (u,v) on the surface 103 may by modeled by transport phasor $\mathbb{L}(u,v)$, where (u,v) are spatial coordinates of the point; (b) transport of light reflecting from point (u,v) on the surface 103 and traveling to the time-of-flight camera 105 may be modeled by transport phasor $\mathbb{C}(u,v,\psi)$, where $\psi$ is the angle between outgoing light reflecting from the surface 103 and a vector 211 normal to surface 103; and (c) the bidirectional reflectance distribution function (BRDF) of the surface may be estimated or measured in advance. The BRDF is used to build a dictionary. Fortunately, in many cases, BRDFs may be approximated with low-dimensional signal models (splines, spherical harmonics, even Gaussians). These approximations are easy to estimate, and are sufficient for the task of source localization.

In the example shown in FIG. 1, a computer 109 performs an algorithm that: (a) takes, as input, ToF camera measurements of intensity and phase of incident light at each pixel, respectively, of the ToF camera; (b) extracts transport phasor $\mathbb{L}(u,v)$ from the measurements, (c) determines a 3D spatial position of the light source, and (d) computes an image of a scene that includes the light source.

In illustrative implementations: (a) the ToF camera measures, at each pixel of the camera, respectively, a phase shift between a reference signal and light incident on the pixel; and (b) the "phase" measured by a ToF camera is either this phase shift or a value calculated from this phase shift.

According to principles of this invention, time-of-flight 3-D imaging may be recast as an array signal processing problem.

To obtain depth, a light source strobes in a periodic pattern and photons are captured with a lock-in CMOS sensor. The carrier signal is the optical signal and the modulation envelope is the strobing pattern with modulation frequency $f_M$. The phase difference between the received and emitted modulation codes, $\phi^M$, encodes the propagation distance via the following linear relation:

$$z = \frac{c\varphi^M}{2\pi f_M}, \qquad \text{(Equation 1)}$$

$$c \approx 3 \times 10^8 \text{ m/s}$$

Here, propagation distance z is the total distance (in meters) of the optical path from the light source to the camera. For example, a common value of $f_M$ is 30 MHz, which corresponds to a wavelength $\lambda$ of 10 meters (where the wavelength is the inverse of the frequency of the amplitude modulation). The camera also measures the amplitude of the reflected light, denoted as A. In summary, a ToF camera measures phase and amplitude at each pixel of the ToF camera.

Source Localization

In illustrative implementations, a 2-D source localization problem is as follows. Consider a set of M sensors spaced evenly on a horizontal axis u. There are K transmitting sources located on the 2-D space parametrized by u and w axis. Denote the signal time delay from k-th source to m-th sensor as $\tau_{k,m}$. Then, in frequency domain, the m-th sensor receives $Y_m(2\pi f_M) = \pi_{k=1}^{K} A_k \exp(-j2\pi f_M \tau_{k,m})$, where $Y_m$ is a discretized vector that represents the discrete frequency domain response of the m-th sensor, and where $A_k$ is amplitude of the reflected light that is attributable to the k-th light source. Substitute using $z = c\tau_{km}$ and Equation 1 yields: $Y_m(2\pi f_M) = \pi_{k=1}^{K} A_k \exp(-j\phi_{k,m}^M)$. The superscript $\mathcal{M}$ on co emphasizes that this is the phase associated with modulation frequency $f_M$, i.e., for a fixed propagation distance z, $\phi^I \neq \phi^J$ for $\mathcal{I} \neq \mathcal{J}$.

As most of the analysis is concerned with narrowband scenarios, the superscript $\mathcal{M}$ on $\phi$ is dropped. Therefore, the observation model is written as:

$$\vec{y} \triangleq [Y_1(2\pi f_M), \ldots, Y_M(2\pi f_M)]^T \qquad \text{(Equation 2)}$$

$$= \left[ \sum_{k=1}^{K} A_k \exp(-j\varphi_{k,1}), \ldots, \sum_{k=1}^{K} A_k \exp(-j\varphi_{k,M}) \right]^T$$

as used herein, $\vec{y}$; is an M-dimensional measurement vector defined over the complex field. Each entry of $\vec{y}$ represents the measured amplitude and phase at a single sensor. To illustrate this point: For the example shown in FIG. 1, the measured amplitude and phase for the virtual sensor located at point (u,v) on surface 103 is represented by an entry of $\vec{y}$. In many implementation: (a) the VSA surface is not purely specular, (b) each single pixel in the ToF camera receives light from multiple virtual sensors, and (c) the so-called "measured" amplitude and phase for a virtual sensor is computationally extracted from measurements taken by ToF camera pixels, each of which pixels receive light from multiple virtual sensors.

Virtual Sensor Array for Reconstruction

Recall that a sensor array is an array of M sensors each measuring phase and amplitude. A virtual sensor array (VSA) effectively turns an ordinary surface into a sensor array. For example, in the corner problem illustrated in FIG.

1: a point source emitter is hidden around the corner and the location and amplitude of the point source are calculated from VSA measurements.

In illustrative implementations for imaging around a corner, a virtual sensor array comprises a set of points (so-called virtual sensors) on a diffusely reflective surface that reflect light to a ToF camera. Light reflecting from the virtual sensors contains information (e.g., phase and amplitude as measured by pixels of the ToF camera) from which the position and intensity of point light sources around a corner may be extracted computationally. The point light sources may be either active light sources or reflectors, and may be part of a surface.

Similarly, in illustrative implementations for imaging through a diffuser, a virtual sensor array comprises a set of points (so-called virtual sensors) on an exterior surface of a diffuse media, such that for each point (i) the point is visible to the ToF camera, and (ii) light from a target object is transmitted through the diffuse media, exits the point, and then travels to the ToF camera. Light transmitted through the diffuse media and virtual sensors contains information (e.g., phase and amplitude as measured by pixels of the ToF camera) from which the position and intensity of point light sources on the other side of the diffuse media may be extracted computationally. The point light sources may be either active light sources or reflectors, and may be part of a surface.

Virtual Sensor Array

In a time-of-flight camera, intensities are parameterized both spatially and temporally as $$c(u,v,t) = A(u,v)\sin(2\pi f \mathcal{M} t + \omega(u,v)) + \zeta(u,v) \quad \text{(Equation 3)}$$

where $c(u,v,t)$ is the correlation waveform with amplitude $A(u,v)$ and phase $\phi(u,v)$.

The quantity $\zeta(u,v)$ is an offset term that represents ambient lighting. Note that $\zeta(u,v)$, $\phi(u,v)$, and $A(u,v)$ are not parameterized in time—these are assumed to be constant over a short integration time. Then, the amplitude and phase may be expressed as a measurement phasor $$\mathbb{M}(u,v) \triangleq A_\mathbb{M}(u,v) e^{j\phi_\mathbb{M}(u,v)} \quad \text{(Equation 4)}$$

In Equation 4, $A_\mathbb{M}$ and $\varphi_\mathbb{M}$ are the amplitude $A(u,v)$ and phase $\phi(u,v)$, respectively, of the correlation waveform. The addition of subscript $\mathbb{M}$ to the amplitude and phase indicates that these two quantities are used to calculate phasor $\mathbb{M}(u,v)$.

Note that the DC offset from Equation 3 is not captured in the phasor notation of Equation 4. This is perfectly fine, as the offset is not useful (it is uncontrolled, ambient light).

Consider the case in FIG. 1, where a single omni-directional point source emits rays of light onto a wall. Localizing the source is trivial when the wall is mirrored, which allows the point source to be observed directly by the camera. This section is concerned with the more general scenario of localizing the point source when the wall is modeled as a Lambertian surface. According to principles of this invention, the wall itself is modeled as a virtual, lensless imaging sensor in the (u,v) plane. A computer performs an algorithm recovers a "lensless image" formed on the virtual sensor.

Consider the complex domain light transport of a unit amplitude strobing signal. As illustrated in FIG. 1, the transport phasor from source to wall is represented as $\mathbb{L}(u,v,\theta)$, where u and v are the coordinates of the wall that the ray strikes at an angle of θ to the normal. Therefore, the phasor that models transport from light source to the diffuse wall is written as $$\mathbb{L}(u, v) = \underbrace{\frac{\cos\theta}{\varphi_\mathbb{L}(u, v)^2}}_{\text{Amplitude Decay}} e^{j\varphi_\mathbb{L}(u,v)} \quad \text{(Equation 5)}$$

In Equations 5 and 6, $\varphi_\mathbb{L}$ is the phase delay for the path from the source to wall (e.g., 103) and $\varphi_\mathbb{M}$ is the phase delay from the wall (e.g., 103) to the time-of-flight camera. For instance, in the example shown in FIG. 1, $\varphi_\mathbb{L} + \varphi_\mathbb{M} = \omega$, ignoring phase wrapping effects. In the preceding sentence, ω is the total phase delay for a one-way path from the light source to the time-of-flight camera via reflection from the wall.

Here, note that $\mathbb{L}$ is parametrized by only u and v because, assuming the geometry in FIG. 1, the angle θ is a function of (u,v). The amplitude of the transport phasor is designed to represent an amplitude decay term. A similar transport phasor models rays emitted from the wall to the camera. As illustrated in FIG. 1, an outgoing ray makes an angle ψ with the normal vector of the wall. The corresponding phase is $\phi$ $\mathbb{C}(u,v)$. Therefore, the transport phasor is $$\mathbb{C}(u, v, \psi) = \rho(u, v) \underbrace{\frac{\cos\psi}{\varphi_\mathbb{C}(u, v)^2}}_{\text{Amplitude Decay}} e^{j\varphi_\mathbb{C}(u,v)} \quad \text{(Equation 6)}$$

where now $\rho(u,v)$ represents the Lambertian albedo of the wall at coordinates (u,v).

Using the two transport phasors as well as the original amplitude of the strobing signal, $A_0$, the combined phasor transport from source to camera is a phasor multiplication:

$$\mathbb{M}(u,v,\psi) = A_0 \mathbb{L}(u,v) \mathbb{C}(u,v,\psi) \quad \text{(Equation 7)}$$

The camera is focused on the wall. Thus, Equation 7 may be written as $$\mathbb{M}(u,v) = A_0 \mathbb{L}(u,v) \int \mathbb{C}(u,v,\psi) d\psi \quad \text{(Equation 8)}$$

where the emitting angle has been integrated out.

Embedded within Equation 8 is the phasor $\mathbb{L}(u,v)$, which is the transport phasor that describes transport of light from the source onto the diffusely reflective surface. In illustrative implementations of this invention, the phasor $\mathbb{L}(u,v)$ is used to solve a phased array, source localization problem. The forward problem is phasor multiplication, thus:

$$\mathbb{L}(u, v) = \left(\frac{1}{A_0}\right)\left(\frac{\mathbb{M}(u, v)}{\mathbb{C}(u, v)}\right) \quad \text{(Equation 9)}$$

Although $\mathbb{C}(u,v)$ is an unknown, computing a depth map of the wall provides the phase $\varphi_\mathbb{C}$. Using $\varphi_\mathbb{C}$ and unit amplitude as a proxy for $\mathbb{C}$ yields $$\begin{aligned}\hat{\mathbb{L}}(u, v) &= \left(\frac{1}{A_0}\right)\left(\frac{\mathbb{M}(u, v)}{e^{j\varphi_\mathbb{C}(u,v)}}\right) \quad \text{(Equation 10)}\\ &= \left(\frac{\cos\theta}{\varphi_\mathbb{L}(u, v)^2} \int \rho(u, v) \frac{\cos\psi}{\varphi_\mathbb{C}(u, v)^2} d\psi\right) e^{j\varphi_\mathbb{L}(u,v)}\\ &= \hat{A}_\mathbb{L}(u, v) e^{j\varphi_\mathbb{L}(u,v)}\end{aligned}$$

Here, $\hat{\mathbb{L}}(u,v)$ is an estimate of $\mathbb{L}(u,v)$ with the correct phase and different amplitude. In order to treat the amplitude as a uniform difference in scaling (across all array elements), the reflectance profile is assumed to be uniform, i.e., $\rho(u,v)$ is the same for all u and v.

The terms $\hat{\varphi}_\mathbb{L}(u,v)$ and $\hat{A}_\mathbb{L}(u,v)$ are the estimated phase and amplitude along the path from the light source to the virtual sensor.

Reconstruction

In illustrative implementations of this invention, 3-D source localization is performed with a 2-D array of sensors, parameterized by (u,v). Each virtual sensor element gives phase and amplitude measurement $\hat{\varphi}_\mathbb{L}(u,v)$ and $\hat{A}_\mathbb{L}(u,v)$. The target is a point source whose real-world location is parameterized in 3-D spatial coordinates (X,Y,Z).

A goal is to estimate a set of points on the wall (e.g., 103) that are in the time-of-flight camera's field of view and that are each, respectively, closest (out of all the points on the wall) to a corresponding point on an exterior surface of the target object. The position of these points (which are observed by the ToF camera) are expressed in terms of the coordinates (û,v̂,ŵ) of the spatial coordinate system for the wall. In contrast, X,Y,Z are spatial coordinates of the actual physical location of the target object, which are not within the coordinate space of the camera.

Consider the following example: A ToF camera images a wall, while a light source is occluded around a corner, as in FIG. 1. The coordinates (u,v,w) of points on the wall in the camera's field of view are known. In this example, for this single light source, a goal is to search all u,v and w to estimate a point on the wall that is closest to the light source. The position of this point (û,v̂,ŵ) on the wall is denoted in terms of the spatial coordinates of the wall.

Figure 2:
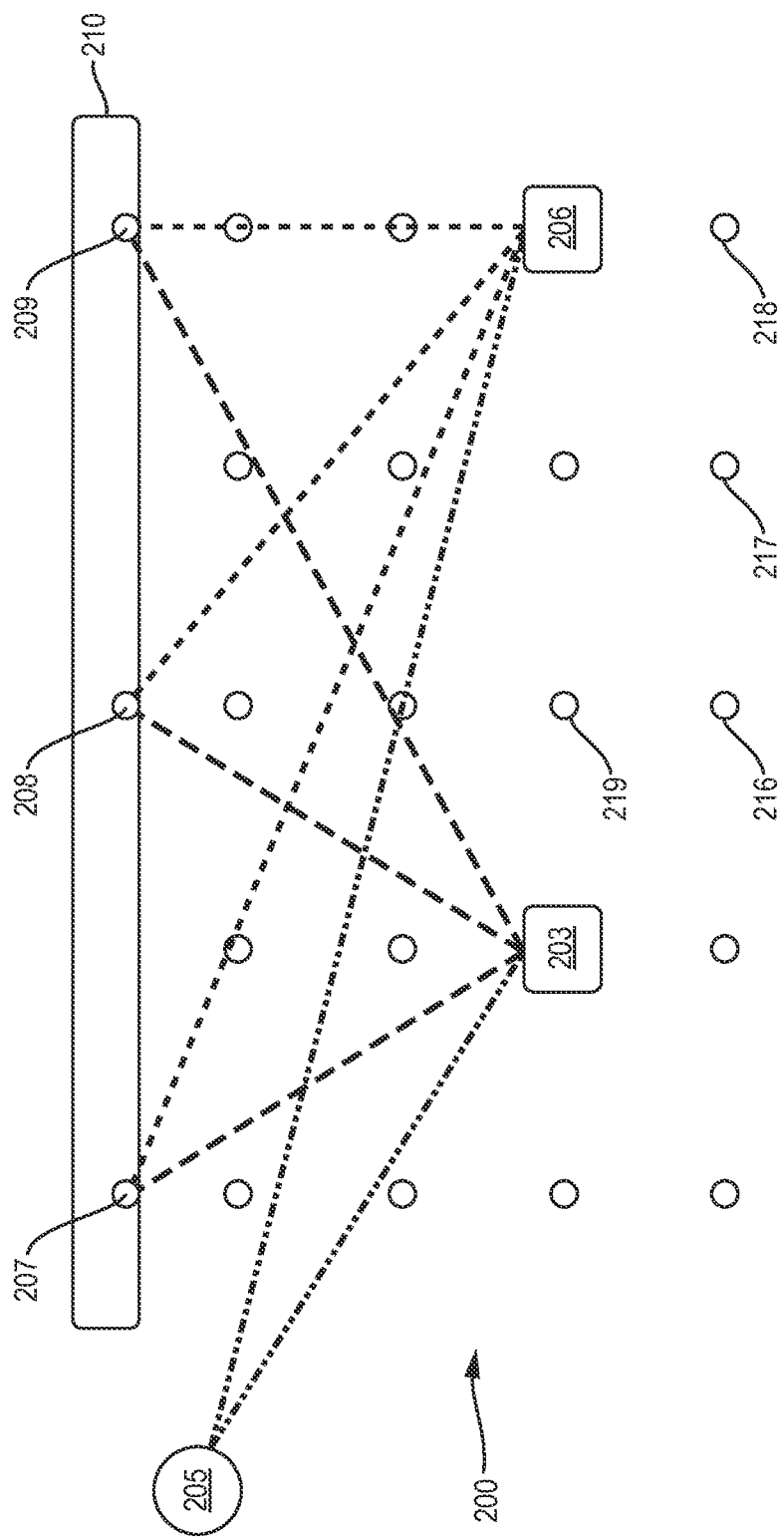
FIG. 2 is a conceptual diagram that shows reflectors.
Figure 3:
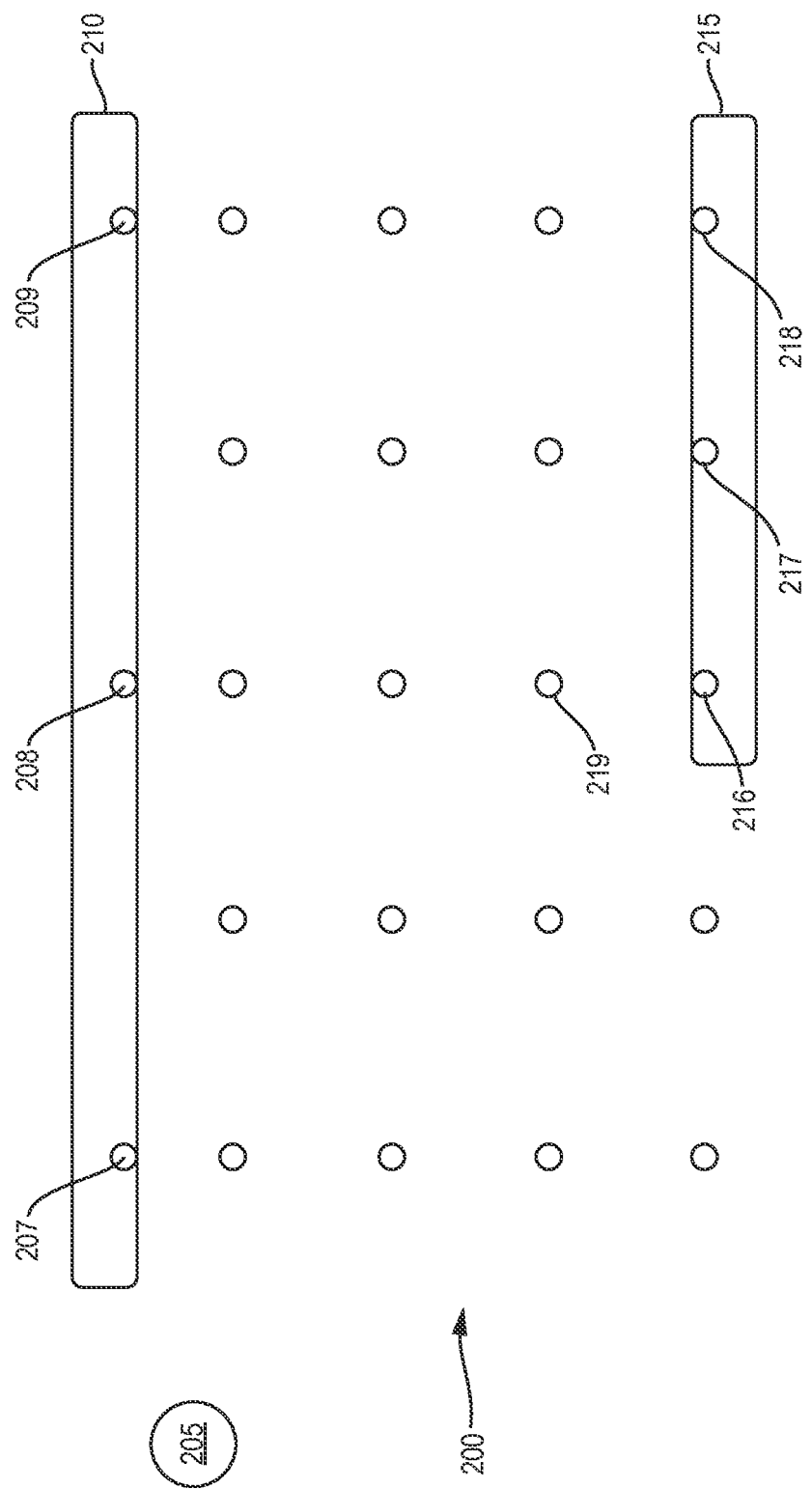
FIG. 3 is another conceptual diagram that shows reflectors.

FIGS. 2 and 3 are each, respectively, a conceptual diagram that shows reflectors, in an exemplary implementation of this invention. FIG. 2 illustrates that point reflectors (e.g., 203, 206) in a voxel grid 200 may be modeled as point emitters of light. In the example shown in FIG. 2, light source 205 emits light. Some of this light (a) travels to point reflector 203, then (b) reflects from reflector 203, then (c) travels to points 207, 208 and 209 on diffusely reflective surface 210. Also, some of the light emitted by the light source 205 (a) travels to point reflector 206, then (b) reflects from reflector 206, then (c) travels to points 207, 208 and 209 on diffusely reflective surface 210. In the examples shown in FIGS. 2 and 3, points 207, 208 and 209 function as virtual sensors.

FIG. 3 illustrates that a reflective surface (e.g. 215) in a voxel grid 200 may be modeled as a set of multiple point reflectors (e.g., points 216, 217, 218).

Without loss of generality, consider 2-D source localization using a 1-D slice of measurements, i.e., to obtain (û,ŵ) by using sensor measurements only along the horizontal u-axis. The measurement vector is of the form $$\vec{y} = [\hat{\mathbb{L}}(u_1) \hat{\mathbb{L}}(u_2) \ldots \hat{\mathbb{L}}(u_M)]^T \quad \text{(Equation 11)}$$

The search space is discretized to a grid of voxels (see FIGS. 2 and 3). This allows source localization algorithms to be used, whereby the set $$G = \{t_i | i=1, \ldots, N; t_i = [u_i, w_i]\} \quad \text{(Equation 12)}$$

denotes the set of N possible grid points.

There are R possible locations on the u-axis and Q possible locations on the w-axis, such that N=RQ. The set $$T = \{t_i | i=1, \ldots, K; t_i = [u_i, w_i]\} \quad \text{(Equation 13)}$$

describes a set of K targets that are located on the voxel grid.

Assume for now that the targets are located on-grid and that K<<N. The task is to find out which voxels contain a target. Concretely, define $$\vec{x} = [x_1 x_2 \ldots x_N]^T \quad \text{(Equation 14)}$$

where each entry of $\vec{x} \in \mathbb{C}^N$ is the weight of confidence that the target is at that voxel.

The connection to sparsity is apparent: targets will lie on K grid locations and the vector $\underline{x}$ is therefore sparse.

Define the operator $$S(u,w):(u,w) \to \mathbb{C}^M \quad \text{(Equation 15)}$$

which takes as input a potential target location and generates the expected measurements along the sensor array.

Define the dictionary matrix D as $$D = [S(u_1,w_1) S(u_2,w_1) \ldots S(u_R,w_Q)] \quad \text{(Equation 16)}$$

where the columns of D have unit norm.

In the backprojection problem, the observed measurement $\underline{y}$; may be represented by K columns of D, such that $$\vec{y} = D\vec{x} \text{ s.t. } \|\vec{x}\|_0 = K \quad \text{(Equation 17)}$$

In illustrative implementations of this invention, a computer performs an algorithm to recover $\vec{x}$ from the objective function set forth in Equation 17. In some cases, a sparse solver (e.g., CoSaMP) is used to solve this objective function directly. In some other cases, in which a sparse solver is not appropriate (e.g., if a good estimate for K is not available), then the algorithm solves for $\underline{x}$ in the following equation:

$$\vec{x} = D^H \vec{y} \quad \text{(Equation 18)}$$

Equation 18 provides an estimate of source location by computing an inner product of the measured signal with each dictionary atom. In Equation 18, entries of $\vec{x}$ with a large magnitude indicate possible source locations and K does not need to be known.

In illustrative implementations of this invention, virtual sensors (e.g., points on the diffusely reflective surface 415) that are illuminated directly by the light source are corrupted and therefore not used for reconstruction. Therefore, the type of light source that is desirable depends on the position of the light source relative to the object being imaged.

In some cases (such as the example shown in FIG. 4), the light source and ToF camera are on the same side of the occluder, and the target object is on the opposite side of the occluder. In these cases, light emitted from the light source reflects off the virtual sensor plane (e.g., 415) before it reaches the target object (e.g., 411 in FIG. 4). Thus, in these cases, it is desirable to use a small-area, collimated source of illumination (e.g., a laser pointer), in order to minimize the number of VSA points that are corrupted by direct illumination from the light source.

In other cases (such as the example shown in FIG. 5), the light source and target object are on the same side of the occluder, and the ToF camera is on the opposite side of the occluder. In these other cases, a broadbeam directional light source (such as a flood illumination source) pointed away from the virtual sensor plane may be used to illuminate the target object (e.g., 411 in FIG. 5).

Figure 4:
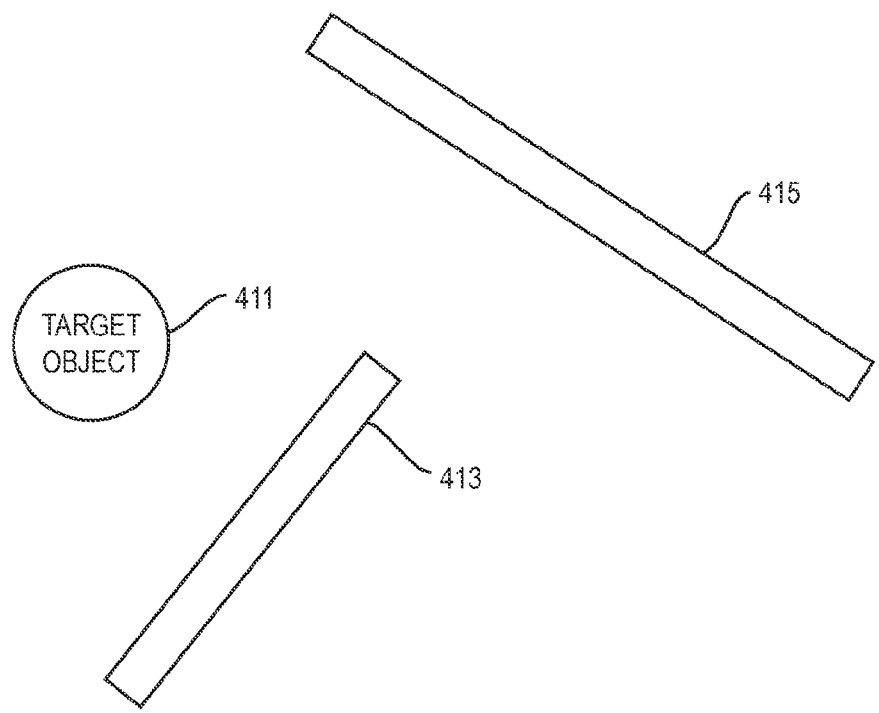
FIG. 4 is a diagram that shows hardware for imaging around a corner, in which the light source and time-of-flight camera are on the same side of the occluder.
Figure 4:
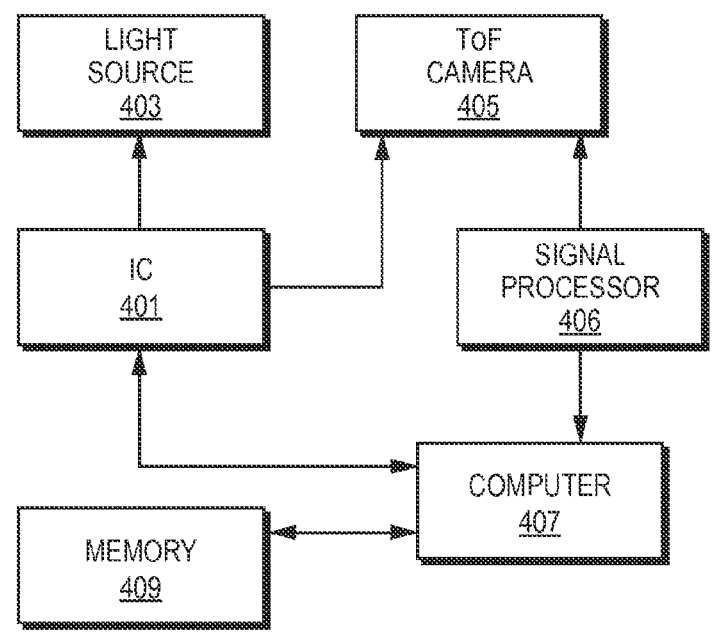
Figure 5:
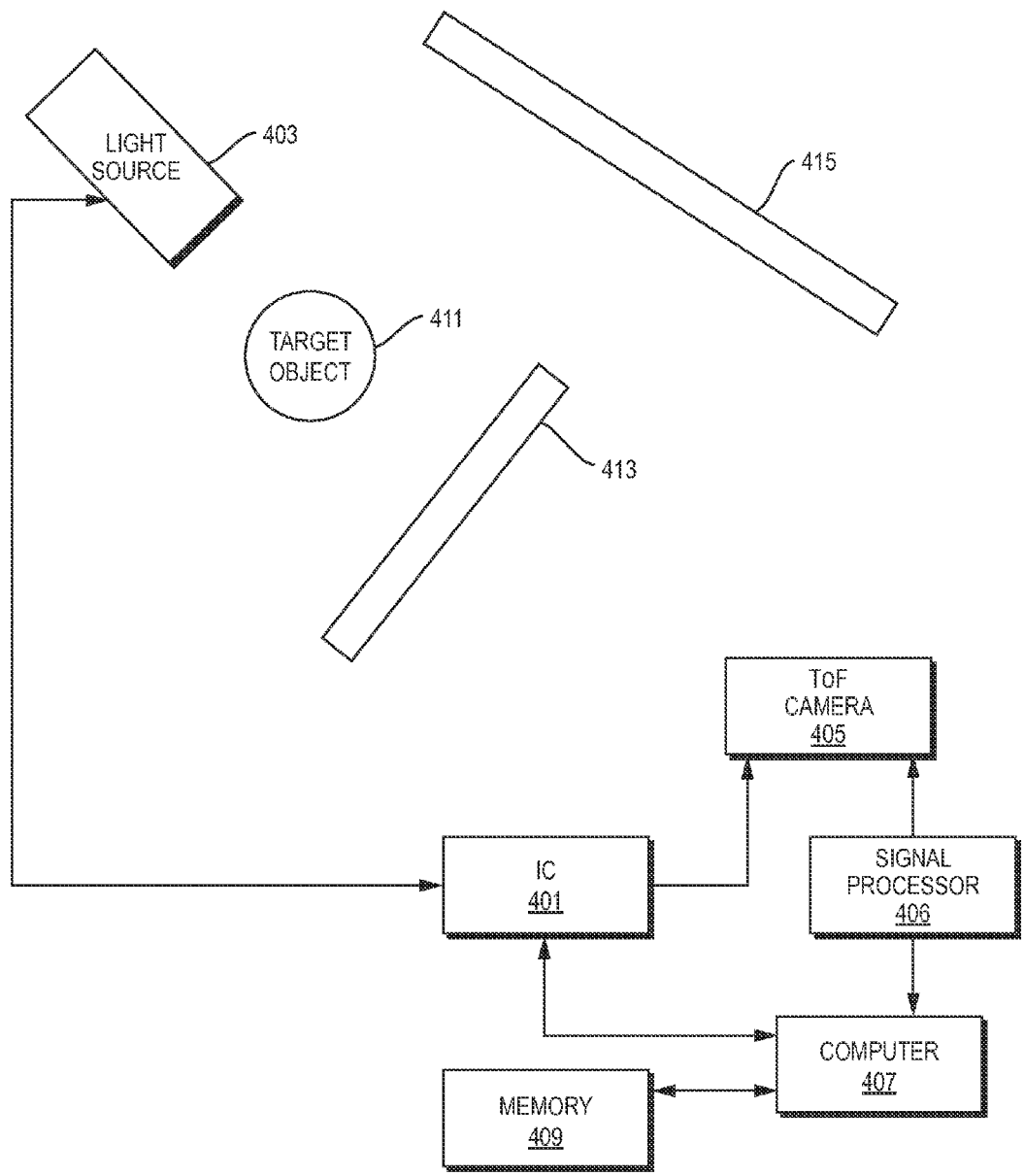
FIG. 5 is a diagram that shows hardware for imaging around a corner, in which the light source and object being imaged are on the same side of the occluder.

In the examples shown in FIGS. 4 and 5, an integrated circuit 401 sends control signals to control a light source 403 and a ToF camera 405. For example, the integrated circuit 401 may comprise a microcontroller or field programmable gate array, and may include a PLL (phase-locked loop).

The ToF camera 405 captures light reflected from surface 415. For example, surface 415 may be diffusely reflective. An occluder 413 prevents light from traveling in a straight line from the target object 411 to the ToF camera 405.

Signal processor 406 processes signals from the ToF camera 405, and outputs digital signals to one or more computers 407. Data may be stored in electronic memory 409. The one or more computers 407 may read data from, or write data to, electronic memory 409.

Generalizing the Model

The model discussed above makes the following five assumptions:

(a) The occluded scene consists of only emitters.
(b) Targets are on grid.
(c) The occluded scene is composed of discrete points.
(d) The light source is not on the same side as the camera.
(e) The reflectance of the wall is Lambertian.

However, as discussed below, the VSA model (and Equations 1-18) are applicable even when these five assumptions do not hold. Thus, this invention may be implemented even when none of these five assumptions are applicable.

Emitters to Reflectors

Recall that a goal of the problem illustrated in FIG. 1 is to localize an active light source around the corner. Of course this is not a realistic scenario: it is unlikely that the hidden object is an active light source. FIG. 2 illustrates a more common scenario of localizing point reflector(s) are around the corner. In illustrative implementations, in order to solve this problem (of localizing a point reflector in the target object), the position of the light source is known a priori. Then the path to each possible voxel location is known and a valid dictionary for the space may be constructed.

In some implementations of this invention, the reflectors in the target object are Lambertian; in other implementations, they are not Lambertian. Indeed, directionality of the reflectors in the target object is equivalent to having a directional array, which facilitates recovery of the position of the target object.

On-Grid to Off-Grid

To this point, the discussion has assumed that point targets, e.g., a point reflector or point source, lies on a search voxel. In realistic scenarios points are not guaranteed to lie on-grid and "off-grid" localization is performed. In illustrative implementations of this invention, a computer performs an algorithm for locating the "off grid" position of a target light source. In some cases, this algorithm comprises iterative multiresolution methods which upsample a dictionary or Continuous Basis Pursuit which interpolates a dictionary.

Points to Surfaces

As illustrated in FIG. 3, the object of interest is usually a continuous surface. In this case, the object can be modeled as many closely spaced point emitters. In this case, the recovered surface may be calculated as a convolution of the surface with the beampattern of a single point source. In some implementations, a computer calculates this convolution in order to recover a blurred version of the occluded surface, where the degree of blur depends on the width of the beampattern of a point source of light.

Illumination Position

In some implementations: (a) a camera looks around corners without any gadgets in the line-of-sight; and (b) therefore it is desirable to have the light source on the same side of the occluder as the camera.

As long as the position of the light source is known— whether it is next to the camera or on the opposite side of the occluder—a dictionary may be constructed for the space.

Positioning the light source next to the ToF camera presents two problems:

(a) Saturation from an area source: conventional ToF cameras are designed to illuminate an area, and thus if an area source is aimed at a wall the direct reflections will saturate the sensor.

(b) Very little light comes back: light has to bounce off the wall twice and the object once before returning to the camera.

In illustrative implementations of this invention, the first problem (saturation) is solved illuminating the VSA surface with collimated light. For example, in some cases, the light source is a laser that emits collimated light, and in some other cases, light from an area light source is partially blocked to create a collimated beam.

In illustrative implementations, the second problem (very little light comes through) is solved by using a more powerful light source than is conventionally included in a ToF camera.

The VSA model holds in regardless of whether the light source is on the same side or opposite side of the occluder as the ToF camera.

Shininess of the Wall and Reflectors

In illustrative implementations for imaging around a corner, it is desirable (but not necessary) for the VSA surface (e.g., a wall) to have directional reflectance (reflectance that is anisotropic and is not omnidirectional). The more directional the reflectance of the VSA surface (e.g., a wall), the better the resolution of the source localization. For example, consider two opposing cases: (i) the wall is a mirror and thus the BRDF has strong directional preference and source localization has a high resolution (that is, the position of the target object may be determined with high resolution), and (ii) the wall is purely diffuse corresponding to a constant BRDF and thus the source localization has a lower resolution.

The directionality of the VSA (determined by the BRDF of the wall) is dual to the directionality of the reflectors in the target object. It is desirable to estimate the BRDF of the wall in advance and to use that estimate when generating dictionary D. This tends to produce a better dictionary D and thus to produce more accurate source localization.

Imaging Through Diffusers

The virtual sensor array (VSA) model also applies to imaging through a diffuse media that scatters light. In that case, the virtual sensors are located on a surface of the diffuse media that is visible from the ToF camera. A computer takes the ToF camera measurements as an input and calculates the location of a light source that is behind the diffuse media.

For example, in some cases, the diffuse media (e.g., 604) that scatters light comprises (a) a solid diffuser, (b) a translucent liquid (such as an emulsion or other colloid) in a transparent or translucent container, or (c) a fog, vapor or other light-scattering aerosol or gas in a transparent or translucent container.

Figure 6:
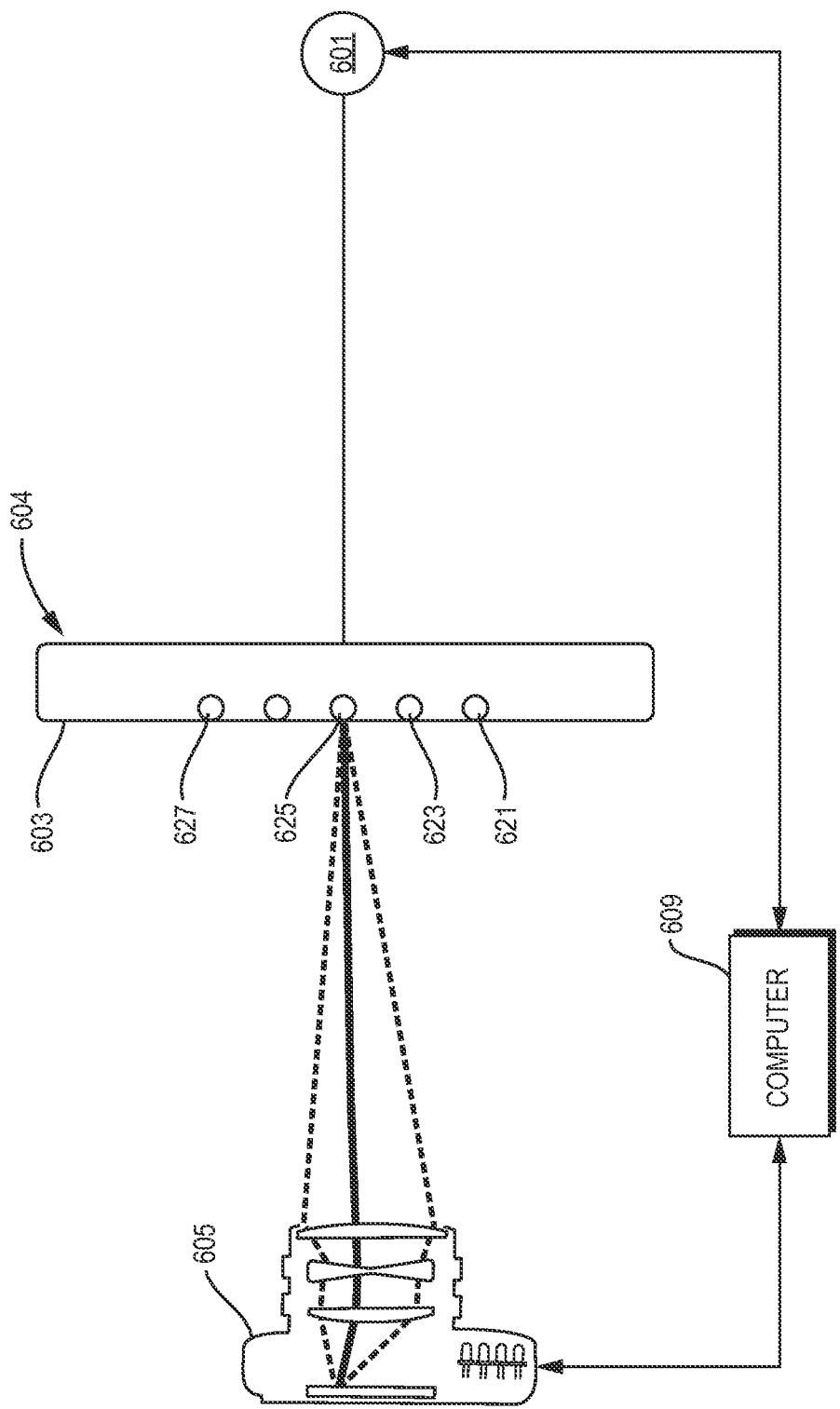
FIG. 6 is a conceptual diagram that shows imaging through a diffuser.

FIG. 6 is a conceptual diagram that shows imaging through a diffuser.

In the example shown in FIG. 6, a light source 601 illuminates a diffuse media 604 that scatters light. The light passes through the diffuse media 604 and travels to a time-of-flight camera 605.

The hardware and functionality in FIG. 6 (diffuse media) are similar to those in FIG. 1 (imaging around a corner). Specifically:

In the example shown in FIG. 6, a surface 603 of the diffuse media 604 is directly visible from the ToF camera 605. This surface 603 functions as a 2D array of virtual sensors (e.g., virtual sensors 621, 623, 625, 627).

In the example shown in FIG. 6: (a) transport of light from the light source 601 to a point (u,v) on the surface 603 may by modeled by a first transport phasor; (b) transport of light transmitted through point (u,v) on the surface 603 and traveling to the time-of-flight camera 605 may be modeled by a second transport phasor that is a function of u,v and the angle between outgoing light transmitted through the surface 603 and a vector normal to surface 603; and (c) the bidirectional transmission distribution function (BTDF) of the surface may be estimated or measured in advance. The BTDF is used to build a dictionary. Fortunately, in many cases, BTDFs may be approximated with low-dimensional signal models (splines, spherical harmonics, even Gaussians). These approximations are easy to estimate, and are sufficient for the task of source localization.

In the example shown in FIG. 6, a computer 609 performs an algorithm that: (a) takes, as input, measurements of intensity and phase by the time-of-flight camera; (b) extracts the first transport phasor from the measurements, and (c) determines the 3D spatial position of the light source that is being detected through the diffuse media.

Consider a transmissive problem: localization of a source through a diffuse media, as shown in FIG. 6. Here, the scattered paths are deflected and thus have a fraction longer time duration to some of the sensors.

The problem is similar to the looking around corners problem in FIG. 1. In the corners problem, the virtual sensor array is the wall itself. In the diffuser problem the virtual sensor array is the visible surface of the diffuser. Similar parallels exist for light transport analysis. Since the corners problem is using reflected measurements, the BRDF controls the directionality of sensors. In contrast, since the diffuser problem uses transmission measurements, sensor directionality is determined by the bidirectional transmittance distribution function (BTDF). Recall that, for imaging around a corner, a mirror has a peaked BRDF. Similarly, for imaging through a diffuser, a transparent object has a peaked BTDF.

In some cases (such as the example shown in FIG. 7), the light source 703 and target object 711 are on the same side of the diffuser 715, and the ToF camera 705 is on the opposite side of the diffuser 715. In these cases, a broadbeam directional light source (e.g., 703) is pointed away from the diffuser 715 (and thus pointed away from the virtual sensor plane) and illuminates the target object 711. For example, in some cases, the broadbeam directional light source comprises a flood illumination source.

Alternatively, in some cases (such as the example shown in FIG. 8), the light source 703 and ToF camera 705 are on the same side of the diffuser 715, and the target object 711 is on the opposite side of the diffuser 715. In these cases, light emitted from the light source travels through the diffuser 715 (and thus through the virtual sensor plane) before it reaches the target object (e.g., 711). Thus, in these cases, it is desirable to use a small-area, collimated source of illumination (e.g., a laser pointer), in order to minimize the number of VSA points that are corrupted by direct illumination from the light source.

Figure 7:
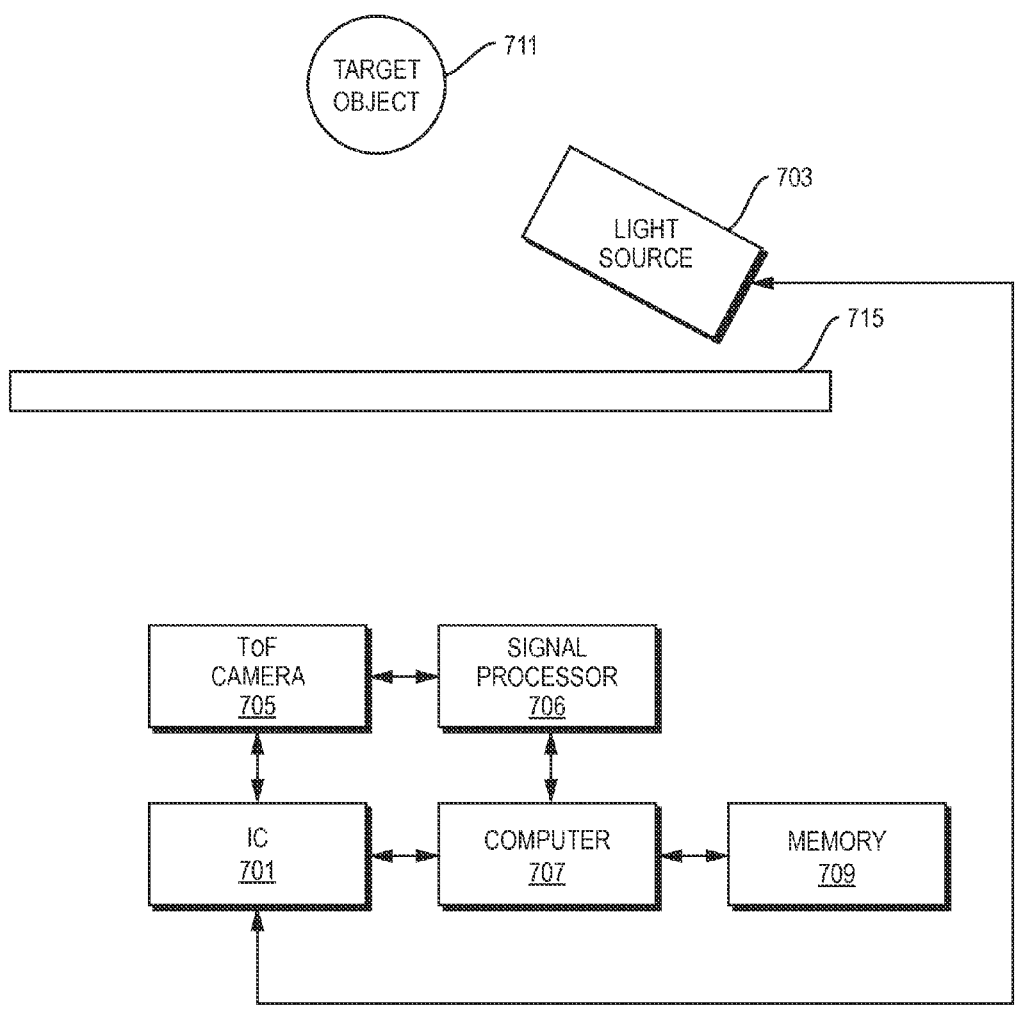
FIG. 7 is a diagram that shows hardware for imaging through a diffuser, in which the light source and object being imaged are on the same side of the diffuser.
Figure 8:
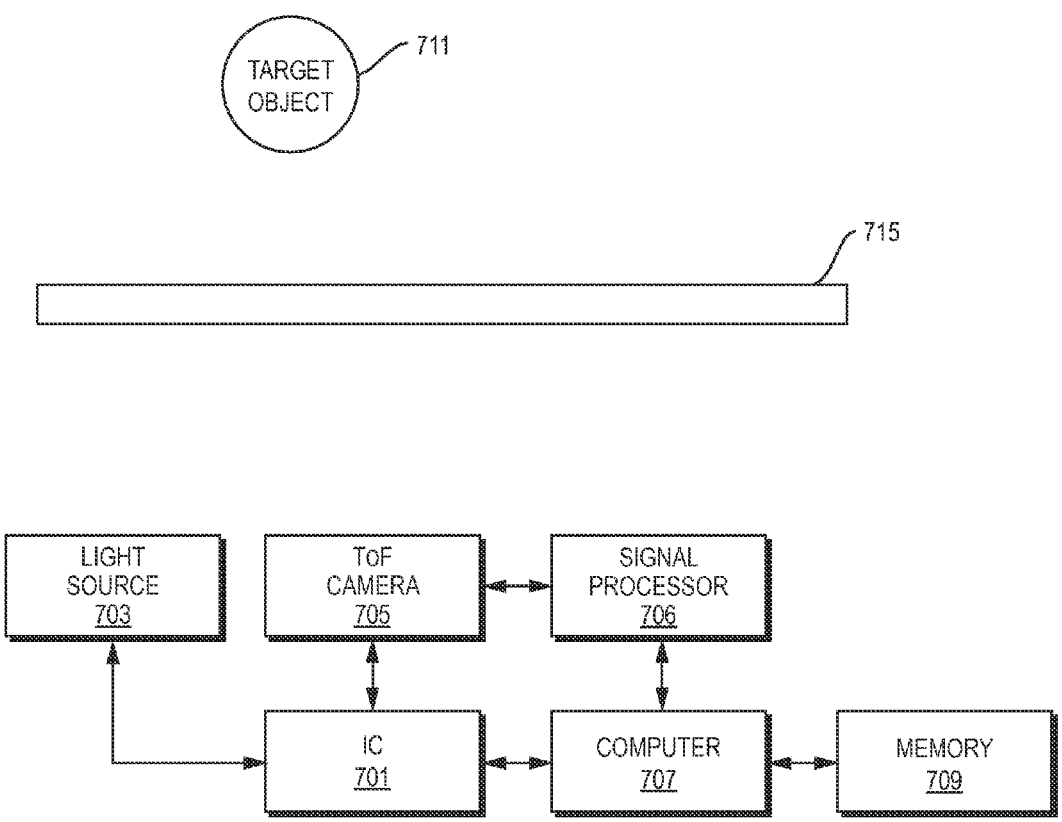
FIG. 8 is a diagram that shows hardware for imaging through a diffuser, in which the light source and time-of-flight camera are on the same side of the diffuser.

In the examples shown in FIGS. 7 and 8, an integrated circuit 701 sends control signals to control a light source 703 and a ToF camera 705. For example, the integrated circuit 701 may comprise a microcontroller or field programmable gate array, and may include a PLL (phase-locked loop).

The ToF camera 705 captures light transmitted through diffuse media 715.

Signal processor 706 processes signals from the ToF camera 705, and outputs digital signals to one or more computers 707. Data may be stored in electronic memory 709. The one or more computers 707 may read data from, or write data to, electronic memory 709.

Analysis of Recoverability

The following sections analyze recoverability of the occluded image. To quantify this analysis, the metric of mutual coherence is helpful. Define mutual coherence $\mu(D)$ as:

$$\mu(D) = \max G_{ij}, G = |D^H D|, i \neq j \qquad \text{(Equation 19)}$$

where $\|D_n\|_2 = 1$ for $n = 1, \ldots, N$.

Mutual coherence computes the similarity between the columns of D. For robust recovery, it is desirable to reduce the mutual coherence, through the choice of physical parameters of the system and the choice of recovery algorithm. As discussed below, the specularity of the VSA surface (e.g., a wall) has an inverse relationship to the FWHM (full width at half maximum). Because the functions discussed above are Gaussian, the relationship holds for mutual coherence, providing a bound on target resolution.

Physical parameters such as specularity of the virtual sensors, gridding, modulation frequency, and aperture size affect the quality of recovery of the occluded image. The following discussion describes how these physical parameters—and the choice of recovery algorithm—relate to the mutual coherence and thus affect the recoverability of the occluded image.

Recovery for Specular Surfaces

When the wall is non-Lambertian, the virtual sensors are no longer omnidirectional. To model the directionality of virtual sensors, define the beampattern as a row of the Gramian matrix G. Equivalently, beampattern is a column of G since G is Hermitian.

The FWHM of the beampattern specifies how far apart two targets must be to resolve both of them.

In some implementations of this invention, the virtual sensors are omnidirectional (i.e., the virtual sensors are Lambertian reflectors) and thus:

$$\text{FWHM}^{\angle} = \arcsin(\lambda/D) \qquad \text{(Equation 20)}$$

where D is the diameter of the sensor array (in meters), $\text{FWHM}^{\angle}$ is the angular resolution (in radians), and wavelength $\lambda$ is the inverse of the frequency of the amplitude modulation of the light.

This equation 20 provides the resolution to which targets may be resolved when the virtual sensors are omnidirectional (i.e., Lambertian reflectors). For example, in an illustrative implementation: (a) a 300 MHz camera has a $\lambda$ of approximately 1 meter; (b) the 2D virtual sensor array is about D=1 meter wide; (c) the virtual sensors are omnidirectional (i.e., are Lambertian reflectors); and (d), according to Equation 20, the resolution to which targets may be distinguished is approximately 1 meter.

Fortunately, if the virtual sensors are directional (e.g. if the VSA wall is shiny or otherwise at least partially specular), then the resolution limit improves.

According to principles of this invention, the FWHM for a directional sensor system (such as a mirror or at least partially specular wall) is.

$$\text{FWHM}^{\angle} = \arcsin((\lambda \gamma^{\angle})/(\lambda + D\gamma^{\angle})) \qquad \text{(Equation 21)}$$

where $\gamma^{\angle}$ is the FWHM of the directional response function of an individual virtual sensor, with units in radians, wavelength $\lambda$ is the inverse of the frequency of the amplitude modulation of the light, and D is the diameter of the sensor array (in meters).

As may be seen from Equation 21, the FWHM for a directional sensor system is a composite of the omnidirectional FWHM (Equation 20) with the FWHM of the individual sensor response ($\gamma^\angle$). If the virtual sensor is omnidirectional (i.e., is a Lambertian reflector), then Equation 21 simplifies to Equation 20: specifically $\lim(\lambda\gamma^\angle)/(\lambda+D\gamma^\angle)=\lambda/D$). Furthermore, a low value of $\gamma^\angle$ corresponds to a narrower FWHM for the system. Equation 21 uses angular quantities for FWHM, but it is also helpful to compute the spatial resolution of imaging system—that is, how far apart do two targets have to be, in order for the imaging system to distinguish them. Looking at Equation 21, it is evident that $\gamma$ has a nonlinear relationship to mutual coherence.

In illustrative implementations, the relation between angular resolution and spatial resolution is $$\text{FWHM}^l = d\text{FWHM}^\angle \quad \text{(Equation 22)}$$

where d is the depth of the object from the array (in meters).

In the preceding discussion, the superscripts for FWHM denote the units of a scalar variable: l for length (meters), $\angle$ for angular quantities in radians, and ° for angular quantities in degrees.

Frequency and Gridding

Equation 23 below is a closed form equation that relates grid spacing and frequency to coherence. Suppose and j' represent the indices of the columns of D that determine the mutual coherence, where $D_i = [\exp(-j\phi_{i',1}) \ldots \exp(-j\phi_{i',l})\%]^T$. Then the mutual coherence is $\mu(D) = \sum_{m=1}^{M} \exp(-j(\phi_{i',m} - \phi_{j',m}))$. Substitution using Equation 1 yields:

$$\mu(D) = \left| \sum_{m=1}^{M} \exp\left(-j\left(\frac{2\pi}{c} f_M (z_{i',m} - z_{j',m})\right)\right) \right| \quad \text{(Equation 23)}$$

where $z_{i',m}$ and $z_{j',m}$ represent the propagation distances for the -th and j-th voxels to the m-th sensor. As may be seen from Equation 23: (a) increasing $f\mathcal{M}$ or decreasing the resolution of the grid would decrease mutual coherence; and (b) both grid spacing and modulation frequency are linear with respect to the exponent.

Size of VSA and Camera Resolution

In Equations 20 and 21 the diameter D of the virtual sensor array is inversely proportional to resolution. Thus, in some cases, it is beneficial to use larger objects as virtual sensors. Changing the number of virtual sensors does not directly change the resolution of targets. However, using too few sensors leads to spatial aliasing artifacts, especially at high modulation frequencies. In illustrative implementations of this invention, virtual sensors are placed apart a distance of $\lambda$ to avoid spatial aliasing, where wavelength $\lambda$ is the inverse of the frequency of the amplitude modulation of the light. In illustrative implementations, the ToF camera's spatial resolution determines how many pixels are mapped to the virtual sensor array. In many implementations, typical modulation frequencies are used, and aliasing is not a factor.

Sparsity of the Scene

As may be seen from Equation 23, recovery becomes harder when the scene is dense (K is high). For dense scenes, Equation 23 is obviated by the bound in Equation 21.

In some implementations, it is beneficial to factor sparsity into the reconstruction. For example, in some applications of the corners problem, obtaining even a sparse reconstruction might be useful (e.g., if the goal is to localize occluded human targets for military applications). In such cases imposing a sparse prior may lead to more stable recovery.

In some cases involving imaging through a diffusive media that scatters light (e.g., as in FIGS. 6, 7 and 8), sparse solvers are used for recovery of an image. In some implementations, the scene is canonically sparse (cf. fluorescence microscopy), which allows sparse priors to be used with impunity.

Sparse approximation refers to the problem of estimating sparse vector that satisfies a linear system of equations. Concretely, given a measurement vector y and a dictionary matrix D, a goal is to solve for x where y=Dx and x is known to be sparse. To solve the linear system and enforce sparsity on x, solutions include iterative approaches that use an $l_1$ regularization penalty or greedy techniques that require multiple projections. Examples of the former include LASSO and Basis Pursuit while examples of the latter include matching pursuits. Another aspect is how to select the dictionary matrix D, such that the problem is well posed. In illustrative implementations, sparse recovery is guaranteed when columns of D have a sufficiently small inner product, or more specifically, a low mutual coherence.

Recovery Algorithms

In illustrative implementations of this invention, a wide variety of recovery algorithms may be employed. For example, a computer may perform any of the recovery algorithms listed in Table I.

Table I lists different recovery algorithms used in a prototype of this invention, in order to recover an occluded image (i.e., an image of a target object that is being imaged around a corner or through a diffuse media).

TABLE I

| Backprojection Solvers | Objective Formulation |
| --- | --- |
| Classic Beamforming | $\hat{\vec{x}} = D^H \vec{y}$ |
| Pseudoinverse | $\hat{\vec{x}} = \underset{\vec{x}}{\operatorname{argmin}} \, \|D\vec{x} - \vec{y}\|_2^2$ |
| CoSaMP | $\hat{\vec{x}} = \underset{\vec{x}}{\operatorname{argmin}} \, \|x\|_0 \text{ s.t. } \vec{y} = D\vec{x}$ |
| Basis Pursuit Denoising | $\hat{\vec{x}} = \underset{\vec{x}}{\operatorname{argmin}} \, \|x\|_1 \text{ s.t. } \|D\vec{x} - \vec{y}\|_2^2 \leq \varepsilon$ |

Which algorithm produces the best recovery depends on the particular application, including characteristics of the scene. For example, in illustrative implementations: (a) if the scene is not sparse then reconstruction via backprojection or pseudoinverse may be optimal in the sense of minimizing the $l_2$ error; and (b) if the scene is sparse then either a greedy algorithm (e.g. compressive sampling matching pursuit (CoSaMP)), or a convex relaxation (e.g. Basis Pursuit Denoising), may result in better performance. Convex relaxations are more robust than greedy algorithms, while the simplicity of greedy algorithms facilitates model based recovery.

Recovery with sparse priors facilitates recovery of closely spaced sources beyond the Rayleigh limit, i.e., superresolution. Sparse priors allow superresolution of reflectors, and hence, potentially higher resolution images of the occluded scene. In an test of a prototype of this invention: (a) two target objects were positioned at 60 cm apart, which was closer than the Rayleigh limit for that particular scene; and (b) a computer performed a Basis Pursuit Denoising (convex relaxation) that resolved the two targets even though they were closer than the Rayleigh limit.

In many cases, backprojection or pseudoinverse solvers are advantageous because: (i) they are easily implemented and (ii) are much more general than solvers that require priors (e.g., sparsity).

As discussed above, the light source may be positioned in different locations when imaging around the corner, including: (a) a first configuration where the light source and target object are on the same side of the occluder (e.g., as in FIG. 4); and (b) a second configuration where the light source and target object are on opposite sides of the occluder (e.g., as in FIG. 5). For example, in a prototype of this invention: (a) a computer performed a CoSaMP algorithm (which is a type of sparse solver algorithm) to recover an occluded target in both the first and second configurations; and (b) a computer performed a beamforming algorithm to recover an occluded target in both the first and second configurations.

In illustrative implementations involving imaging an object around a corner or through a diffuse media, a computer represents measurements taken by the time-of-flight camera as a system of simultaneous linear equations. For example, in some cases, this system of simultaneous linear equations is represented by a matrix. In illustrative implementations, a computer performs an algorithm that takes this system of simultaneous linear equations as an input and solves a linear inverse problem to (i) recover an image of an occluded target object; or (ii) to compute a 3D position for each point in a set of points on an exterior surface of the target object. The occluded object is viewable, from the camera's vantage point, only around a corner or through a diffuse media. Solving the linear inverse problem comprises solving the system of linear equations. A wide range of algorithms may be used to solve the system of linear equations. For example, in some implementations, a computer uses any one or more of the algorithms listed in Table I (including classic beamforming, pseudoinverse, CoSaMP, and basis pursuit denoising) in order to solve the system of linear equations. In some implementations, a computer performs an algorithm that solves a linear inverse problem by solving Equation 17 or Equation 18, above.

Real Time Recovery

In a test of a prototype of this invention, a reflective target object was occluded from the camera's line-of-sight. The reflector was placed in motion and was localized in real-time using a backprojection algorithm.

Directionality of the Virtual Sensor Array

In a test of a prototype of the invention, the inventors tested different materials for a wall (e.g. 103, 210, 415) that comprises a virtual surface array used for imaging around a corner. The four materials were, in increasing order of specularity: (i) posterboard; (ii) photo paper; (iii) metal; and (iv) a mirror.

TABLE II

| Material | $\rho_s$ | $\alpha$ | $\gamma^\circ$ | $\gamma^I$ | FWHM$^\circ$ | FWHM$^I$ |
|---|---|---|---|---|---|---|
| Posterboard | 238 | 0.17 | 32.87 | 0.59 | 35.0 | 0.61 |
| Photo Paper | 2 | 0.01 | 2.02 | 0.03 | 1.72 | 0.03 |
| Metal | 1 | 0.002 | 0.93 | 0.01 | 0.57 | 0.01 |

In Table II, quantitative reflectance parameters for the first three materials are listed. In Table II, $\rho_s$ and $\alpha$ measure the specular intensity and surface roughness, as defined in the Ward BRDF model. The directionality of the sensor is determined by the BRDF of the surface. Note $\gamma^I$. Also, note FWHM$^I$ in centimeters, which factors into Equation 22. In illustrative implementations, the BRDF of the wall is an input to an algorithm that generates the forward operator D.

Resolving Multiple Point Sources

A helpful performance metric for imaging around a corner is the minimum distance at which two target objects that are reflectors are distinguishable, without relying on sparsity assumptions. This depends, in part, on the material used for the VSA surface (e.g. 103, 210, 415). For example, in a test performed using a prototype of this invention, a computer performed an pseudoinverse backprojection algorithm to localize (around a corner) two point sources (ping pong balls) that were 10 centimeters apart; and a beampattern, which is one row of the Gram matrix G, was plotted. In this test: (a) when the VSA surface comprised posterboard, the beampattern was wide, and the Gram matrix was coherent; (b) the beampattern narrowed as the material changed from posterboard to photo paper to metal to mirror; and (c) for the mirror, the beampattern was a Dirac and the mutual coherence reached the minimum value of 0.

In this test, the minimum separation between the two ping pong balls that was detectable was 10 cm for the posterboard, 3 cm for the photo paper, and 2 cm for the metal 2 cm.

Even when using the relatively diffuse posterboard an image of target objects around the corner is obtained if the target objects are large enough. For any given fixed reflectance, increasing the modulation frequency scales linearly with resolution.

In illustrative implementations, the bound provided in Equation 21 guarantees success when using the solver (i.e. $\hat{\vec{x}} = D^H \vec{y}$). In tests of a prototype of this invention, resolution close to an order of magnitude better was achieved using a stronger solver, such as the pseudoinverse. For example, in a test of a prototype of this invention, the beampattern was approximately 1 meter wide, and the system was able to resolve targets 10 cm apart. There are many ways to derive sharper guarantees on recovery based on sparsity, priors, rank constraints, and more; however, such guarantees require specific model assumptions and in-depth calculations.

Figure 9:
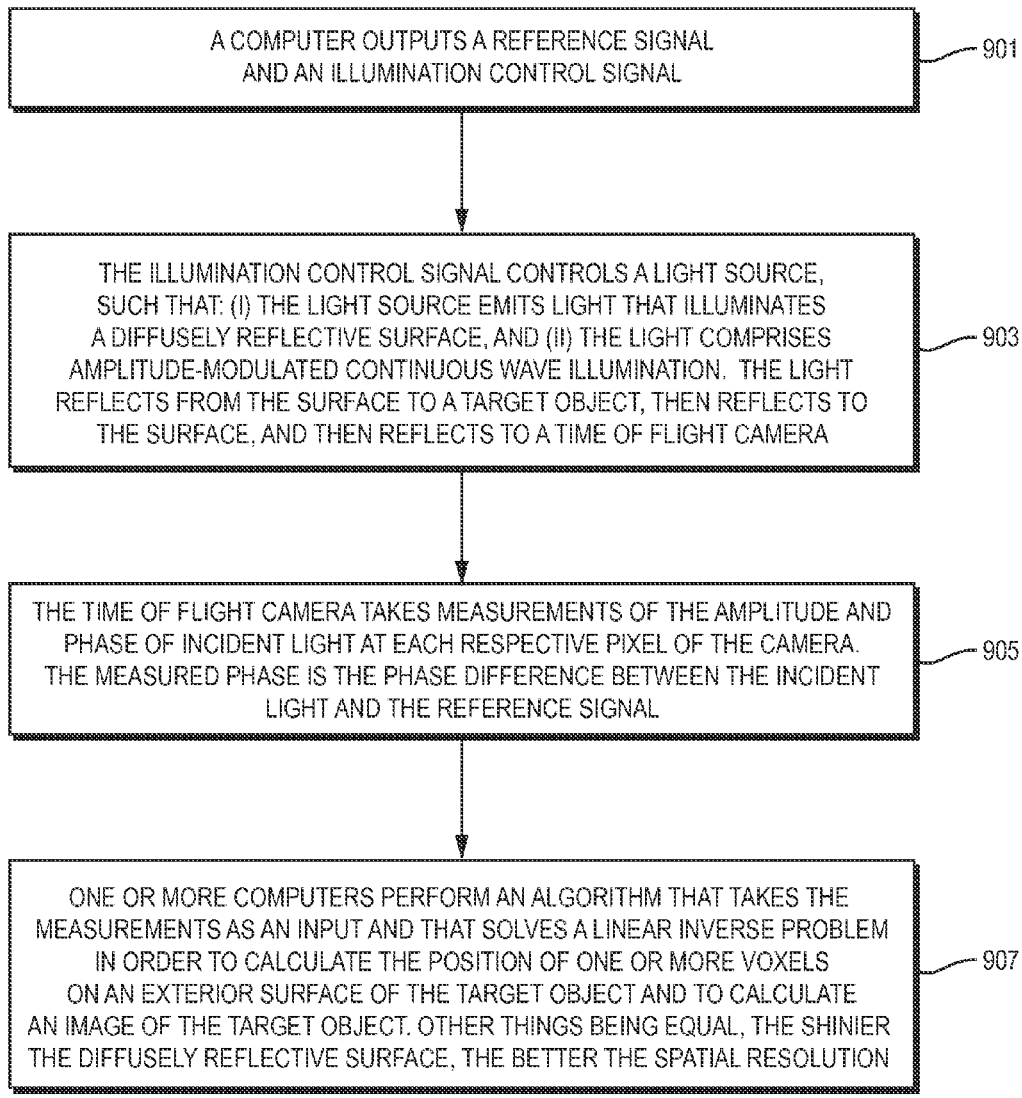
FIG. 9 shows steps in a method for imaging around a corner.

FIG. 9 shows steps in a method for imaging around a corner. In the example shown in FIG. 9, the steps include: A computer outputs a reference signal and an illumination control signal (Step 901). The illumination control signal controls a light source, such that: (i) the light source emits light that illuminates a diffusely reflective surface, and (ii) the light comprises amplitude-modulated continuous-wave illumination. The light reflects from the surface to a target object, then reflects from the target object to the surface, and then reflects to a time-of-flight camera (Step 903). The time-of-flight camera takes measurements of the amplitude and phase of incident light at each respective pixel of the camera. The measured phase is the phase difference between the incident light and the reference signal. The time-of-flight camera measures a cross-correlation of the reference signal and the light that reflects to the camera (Step 905). One or more computers perform an algorithm that takes the measurements as an input and that solves a linear inverse problem in order to calculate the position of one or more voxels on an exterior surface of the target object and to calculate an image of the target object. The shinier the diffusely reflective surface, the better the spatial resolution of the recovered image. (Step 907).

Figure 10:
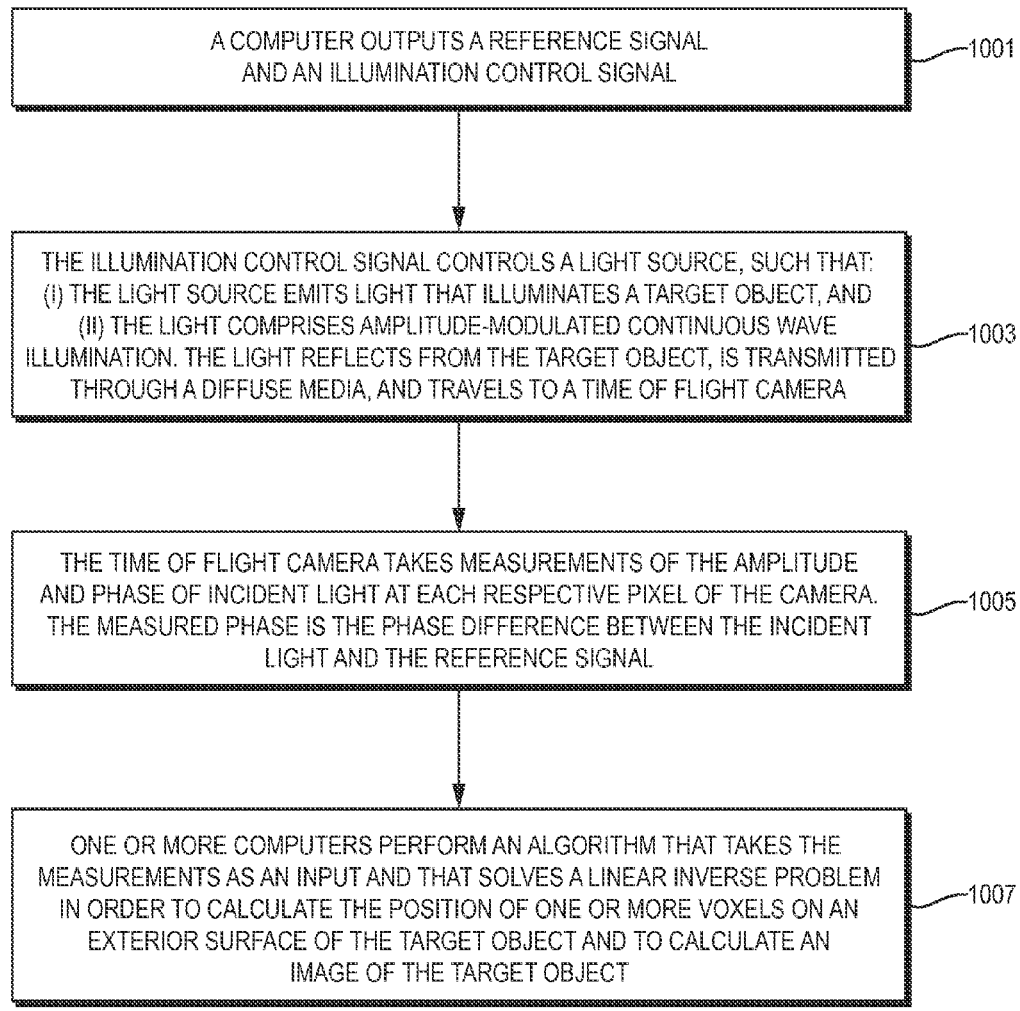
FIG. 10 shows steps in a method for imaging through a diffuse media.

FIG. 10 shows steps in a method for imaging through a diffuse media. In the example shown in FIG. 10, the steps include: A computer outputs a reference signal and an illumination control signal (Step 1001). The illumination control signal controls a light source, such that: (i) the light source emits light that illuminates an object, and (ii) the light comprises amplitude-modulated continuous-wave illumination. The light reflects from the object, then is transmitted through a diffuse media, and then travels to a time-of-flight camera (Step 1003). The time-of-flight camera takes measurements of the amplitude and phase of incident light at each respective pixel of the camera. The measured phase is the phase difference between the incident light and the reference signal. The time-of-flight camera measures a cross-correlation of the reference signal and the light that reflects to the camera (Step 1005). One or more computers perform an algorithm that takes the measurements as an input and that solves a linear inverse problem in order to calculate the position of one or more voxels on an exterior surface of the target object and to calculate an image of the target object. The less the diffuse media scatters light, the better the spatial resolution of the recovered image. (Step 1007).

Computers

In exemplary implementations of this invention, one or more electronic computers (e.g. 109, 401, 407, 701, 707) are programmed and specially adapted: (1) to control the operation of, or interface with, hardware components of a ToF camera, including any light source and any light sensor; (2) to control the amplitude modulation of a light source; (3) to generate a reference signal for a ToF camera; (4) to perform an algorithm to recover an image of an object around a corner or through a diffusive media; (5) to perform a source localization algorithm to estimate the position of a target object, from light that travels from a target object and reflects off a surface or is transmitted through a diffusive media; (6) to perform any other calculation, computation, program, algorithm, computer function or computer task described or implied above; (7) to receive signals indicative of human input; (8) to output signals for controlling transducers for outputting information in human perceivable format; and (9) to process data, to perform computations, to execute any algorithm or software, and to control the read or write of data to and from memory devices. The one or more computers may be in any position or positions within or outside of the ToF camera. For example, in some cases (a) at least one computer is housed in or together with other components of the ToF camera, and (b) at least one computer is remote from other components of the ToF camera. The one or more computers are connected to each other or to other components in the ToF camera either: (a) wirelessly, (b) by wired connection, or (c) by a combination of wired and wireless links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of a ToF camera, including any light source and any light sensor; (2) to control the amplitude modulation of a light source; (3) to generate a reference signal for a ToF camera; (4) to perform an algorithm to recover an image of an object around a corner or through a diffusive media; (5) to perform a source localization algorithm to estimate the position of a target object, from light that travels from a target object and reflects off a surface or is transmitted through a diffusive media; (6) to perform any other calculation, computation, program, algorithm, computer function or computer task described or implied above; (7) to receive signals indicative of human input; (8) to output signals for controlling transducers for outputting information in human perceivable format; and (9) to process data, to perform computations, to execute any algorithm or software, and to control the read or write of data to and from memory devices.

Network Communication

In illustrative implementations of this invention, an electronic device (e.g. 105, 109, 401, 405, 407, 701, 705, 707) is configured for wireless or wired communication with other electronic devices in a network.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g. 109, 401, 407, 701, 707) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetoothhigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

In some implementations: (a) one or more computers, cameras or light sources include a wireless communication module for wireless communication with other electronic devices in a network; (b) each wireless communication module includes one or more antennas, one or more wireless transceivers, transmitters or receivers, and signal processing circuitry; and (c) the wireless communication module receives and transmits data in accordance with one or more wireless standards.

Definitions

The terms "a" and "an", when modifying a noun, do not imply that only one of the noun exists.

As used herein, "bandlimited signal" means a signal such that a difference of more than 3 decibels exists between the magnitude of a first frequency component of the signal and the magnitude of a second frequency component of the signal, where the first and second frequency components each have a non-zero magnitude. For example: (a) a Dirac impulse is not a band-limited signal; and (b) a sine wave is a bandlimited signal.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Continuous-wave light" means light that comprises a bandlimited signal.

"Defined Term" means a term or phrase that is set forth in quotation marks in this Definitions section.

"Diffuse media" means a physical substance or mixture of physical substances that at least partially scatters light which is transmitted through the substance or mixture. For example, each substance in a diffuse media may be in any phase of matter, including gas, liquid or solid. Also, for example, a mixture of substances in a diffuse media may comprise an aerosol, emulsion, colloid, or suspension.

"Diffuse reflection" means reflection from a diffusely reflective surface.

A "diffusely reflective" surface means a surface that is not a mirror and that is not purely specular. For example, a purely Lambertian surface is diffusely reflective. Also, for example, a non-mirrored surface that scatters reflected light but is not purely Lambertian is diffusely reflective.

For an event to occur "during" a time period, it is not necessary that the event occur throughout the entire time period. For example, an event that occurs during only a portion of a given time period occurs "during" the given time period.

The term "e.g." means for example.

"Equation 1" means Equation 1 listed above.
"Equation 2" means Equation 2 listed above.
"Equation 3" means Equation 3 listed above.
"Equation 4" means Equation 4 listed above.
"Equation 5" means Equation 5 listed above.
"Equation 6" means Equation 6 listed above.
"Equation 7" means Equation 7 listed above.
"Equation 8" means Equation 8 listed above.
"Equation 9" means Equation 9 listed above.
"Equation 10" means Equation 10 listed above.
"Equation 11" means Equation 11 listed above.
"Equation 12" means Equation 12 listed above.
"Equation 13" means Equation 13 listed above.
"Equation 14" means Equation 14 listed above.
"Equation 15" means Equation 15 listed above.
"Equation 16" means Equation 16 listed above.
"Equation 17" means Equation 17 listed above.
"Equation 18" means Equation 18 listed above.
"Equation 19" means Equation 19 listed above.
"Equation 20" means Equation 20 listed above.
"Equation 21" means Equation 21 listed above.
"Equation 22" means Equation 22 listed above.
"Equation 23" means Equation 23 listed above.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. For example, an I/O device includes any device for (a) receiving input from a human, (b) providing output to a human, or (c) both. For example, an I/O device includes a user interface, graphical user interface, keyboard, mouse, touch screen, microphone, handheld controller, display screen, speaker, or projector for projecting a visual display. Also, for example, an I/O device includes any device (e.g., button, dial, knob, slider or haptic transducer) for receiving input from, or providing output to, a human.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

As used herein, (i) a single scalar is not a "matrix", and (ii) one or more entries, all of which are zero (i.e., a so-called null matrix), is not a "matrix".

To "multiply" includes to multiply by an inverse. Thus, to "multiply" includes to divide.

The term "or" is inclusive, not exclusive. For example A or B is true if A is true, or B is true, or both A or B are true.

Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

The "phase" of a first signal: (a) may be measured by measuring a phase shift between the first signal and a reference signal; and (b) may be denoted or represented by the phase shift.

To compute a term that "satisfies" an equation: (a) does not require that calculations involve terms, variables or operations that are in the equation itself, as long as a solution of the equation (subject to error, as described in part (b) of this sentence) is computed; and (b) includes computing a solution that differs from a correct solution of the equation by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a group with no elements. Mentioning a first set and a second set does not, in and of itself, create any implication regarding whether or not the first and second sets overlap (that is, intersect).

"Some" means one or more.

To say that a first spatial resolution is "better" than a second spatial resolution means that the minimum distance between two objects at which the two objects are resolvable is smaller in the first spatial resolution than in the second spatial resolution.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

"3D" means three dimensional.

A "time-of-flight camera" means a camera that measures, for each respective pixel in a set of pixels of the camera, phase of light incident at the respective pixel and amplitude of light incident at the respective pixel.

To say that a machine-readable medium is "transitory" means that the medium is a transitory signal, such as an electromagnetic wave.

A matrix may be indicated by a bold capital letter (e.g., D). A vector may be indicated by a bold lower case letter (e.g., $\alpha$). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, Applicant is acting as Applicant's own lexicographer.

Variations

This invention may be implemented in many different ways. Here are some non-limiting examples:

In one aspect, this invention is an apparatus comprising, in combination: (a) an active light source; (b) a time-of-flight camera, which camera is configured for taking measurements of phase and amplitude of incident light at each pixel, respectively, in a set of pixels of the camera, which incident light comprises amplitude-modulated continuous-wave light that (i) is emitted by the active light source and reflects from the object, and then (ii) travels to a diffusely reflective surface, and then (iii) reflects from the diffusely reflective surface and travels to the time-of-flight camera; and (c) a computer for performing a calculation that computes, for each respective point in a set of points on a surface of the object, a 3D position of the respective point, wherein the calculation involves solving a system of linear equations that represents the measurements. In some cases, the calculation includes solving Equation 17. In some cases, the calculation includes solving Equation 18. In some cases, the calculation includes executing a pseudoinverse algorithm. In some cases, the calculation includes executing a CoSaMP algorithm. In some cases, the calculation includes executing a basis pursuit denoising algorithm. In some cases, the calculation includes executing a convex relaxation algorithm. In some cases, the calculation includes executing a greedy algorithm. In some cases, the calculation includes determining a distance traveled by light based on a phase difference between light incident on the time-of-flight camera and a reference signal. In some cases, the calculation includes computing an image of the object in real time. In some cases, the diffusely reflective surface is not a Lambertian reflector. In some cases: (a) an occluder prevents light from traveling in a straight line from the object to the time-of-flight camera; and (b) the light source is on the same side of the occluder as the object. In some cases: (a) an occluder prevents light from traveling in a straight line from the object to the time-of-flight camera; and (b) the light source is on the same side of the occluder as the time-of-flight camera. In some cases, the system of linear equations is represented by a matrix. Each of the cases described above in this paragraph is an example of the apparatus described in the first sentence of this paragraph, and is also an example of an embodiment of this invention that may be combined with other embodiments of this invention.

In another aspect, this invention is an apparatus comprising, in combination: (a) an active light source; (b) a time-of-flight camera, which camera is configured for taking measurements of phase and amplitude of incident light at each pixel, respectively, in a set of pixels of the camera, which incident light comprises amplitude-modulated continuous-wave light that (i) is emitted by the active light source and reflects from the object, and then (ii) travels through a diffuse media, and (iii) then travels to the time-of-flight camera; and (c) a computer for performing a calculation that computes, for each respective point in a set of points on a surface of the object, a 3D position of the respective point, wherein the calculation involves solving a system of linear equations that represents the measurements. In some cases, the diffuse media comprises a solid diffuser. In some cases, the diffuse media comprises an aerosol, colloid, suspension or emulsion. In some cases, the system of linear equations is represented by a matrix. In some cases, the calculation includes solving Equation 17. In some cases, the calculation includes solving Equation 18. In some cases, the calculation includes executing a pseudoinverse algorithm. In some cases, the calculation includes executing a CoSaMP algorithm. In some cases, the calculation includes executing a basis pursuit denoising algorithm. In some cases, the calculation includes executing a convex relaxation algorithm. In some cases, the calculation includes executing a greedy algorithm. Each of the cases described above in this paragraph is an example of the apparatus described in the first sentence of this paragraph, and is also an example of an embodiment of this invention that may be combined with other embodiments of this invention.

In another aspect, this invention is a method comprising, in combination: (a) a light source emitting amplitude-modulated continuous-wave light which light, after leaving the light source (i) is at least partially scattered during transmission through a diffuse media or during diffuse reflection, and (ii) then travels to a time-of-flight camera; (b) the time-of-flight camera taking measurements at each pixel, respectively, in a set of pixels of the camera, of phase and amplitude of the light; and (c) a computer performing a calculation that computes, for each respective point in a set of points on a surface of the object, a 3D position of the respective point, wherein the calculation involves solving a system of linear equations that represents the measurements. In some cases, the light reflects from a diffusely reflective surface during the diffuse reflection. In some cases, the light is transmitted through a diffuse media that comprises a solid diffuser, aerosol, colloid, suspension or emulsion. In some cases, the calculation includes solving Equation 17. In some cases, the system of linear equations is represented by a matrix. In some cases, the calculation includes solving Equation 18. In some cases, the calculation includes executing a pseudoinverse algorithm. In some cases, the calculation includes executing a CoSaMP algorithm. In some cases, the calculation includes executing a basis pursuit denoising algorithm. In some cases, the calculation includes executing a convex relaxation algorithm. In some cases, the calculation includes executing a greedy algorithm. Each of the cases described above in this paragraph is an example of the method described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. An apparatus comprising, in combination:
  (a) an active light source;
  (b) a time-of-flight camera which is configured to take measurements of phase and amplitude of incident light at each pixel, respectively, in a set of pixels of the camera, which incident light comprises amplitude-modulated continuous-wave light that (i) is emitted by the active light source and reflects from an object, and then (ii) travels to a diffusely reflective surface, and then (iii) reflects from the diffusely reflective surface and travels to the time-of-flight camera; and
  (c) a computer that is programmed to perform a calculation that computes, for each respective point in a set of points on a surface of the object, a 3D position of the respective point, wherein the calculation involves solving a system of linear equations that represents the measurements.

2. The apparatus of claim 1, wherein the calculation includes solving $\vec{y}=D\vec{x}$ s.t. $\|\vec{x}\|_0=K$, where: (a) each entry of vector $\vec{y}$ represents measured amplitude and phase at a position on the diffusely reflective surface; (b) each entry of vector $\vec{x}$ is a weight of confidence that a target on the object is at a voxel in a discretized voxel grid consisting of N voxel grid points; (c) there are K targets in the voxel grid; (d) D is a matrix defined as $D=[S(u_1,w_1)\ S(u_2,w_1)\ \ldots\ S(u_R,w_Q)]$, (e) $S(u,w)$ is an operator that takes as input a potential location of a target point on the object and that outputs measurements expected at positions on the diffusively reflective surface; (f) u and w are spatial coordinates of locations on the diffusely reflective surface; and (g) there are R discrete locations on a u-axis and Q discrete locations on a w-axis, such that N=RQ.

3. The apparatus of claim 1, wherein the calculation includes solving $\hat{\vec{x}}=D^H\vec{y}$, where: (a) each entry of vector $\vec{y}$ represents measured amplitude and phase at a position on the diffusely reflective surface; (b) each entry of vector $\hat{\vec{x}}$ is a weight of confidence that a target on the object is at a voxel in a discretized voxel grid consisting of N voxel grid points; (c) there are K targets in the voxel grid; (d) D is a matrix defined as $D=[S(u_1,w_1)\ S(u_2,w_1)\ \ldots\ S(u_R,w_Q)]$, (e) $S(u,w)$ is an operator that takes as input a potential location of a target point on the object and that outputs measurements expected at positions on the diffusively reflective surface; (f) u and w are spatial coordinates of locations on the diffusely reflective surface; (g) there are R discrete locations on a u-axis and Q discrete locations on a w-axis, such that N=RQ; and (h) matrix $D^H$ is the conjugate transpose of matrix D.

4. The apparatus of claim 1, wherein the calculation includes executing a pseudoinverse algorithm.

5. The apparatus of claim 1, wherein the calculation includes executing a basis pursuit denoising algorithm.

6. The apparatus of claim 1, wherein the computer is programmed to estimate a set of points on the diffusely reflective surface that are in the camera's field-of-view and that are each, respectively, closest, out of all points on the diffusely reflective surface, to a corresponding point on the surface of the object.

7. The apparatus of claim 1, wherein the calculation includes computing an image of the object in real time.

8. The apparatus of claim 1, wherein the diffusely reflective surface is not a Lambertian reflector.

9. The apparatus of claim 1, wherein:
(a) an occluder prevents light from traveling in a straight line from the object to the time-of-flight camera; and
(b) the light source is on the same side of the occluder as the object.

10. The apparatus of claim 1, wherein:
(a) an occluder prevents light from traveling in a straight line from the object to the time-of-flight camera; and
(b) the light source is on the same side of the occluder as the time-of-flight camera.

11. The apparatus of claim 1, wherein the system of linear equations is represented by a matrix.

12. An apparatus comprising, in combination:
(a) an active light source;
(b) a time-of-flight camera which is configured to take measurements of phase and amplitude of incident light at each pixel, respectively, in a set of pixels of the camera, which incident light comprises amplitude-modulated continuous-wave light that (i) is emitted by the active light source and reflects from an object, and then (ii) travels through a diffuse media, and (iii) then travels to the time-of-flight camera; and
(c) a computer for performing a calculation that computes, for each respective point in a set of points on a surface of the object, a 3D position of the respective point, wherein the calculation involves solving a system of linear equations that represents the measurements.

13. The apparatus of claim 12, wherein the diffuse media comprises a solid diffuser.

14. The apparatus of claim 12, wherein the diffuse media comprises an aerosol, colloid, suspension or emulsion.

15. A method comprising, in combination:
(a) a light source emitting amplitude-modulated continuous-wave light which light, after leaving the light source (i) is at least partially scattered during transmission through a diffuse media or during diffuse reflection, and (ii) then travels to a time-of-flight camera;
(b) the time-of-flight camera taking measurements at each pixel, respectively, in a set of pixels of the camera, of phase and amplitude of the light; and
(c) a computer performing a calculation that computes, for each respective point in a set of points on a surface of an object, a 3D position of the respective point, wherein the calculation involves solving a system of linear equations that represents the measurements.

16. The method of claim 15, wherein the light reflects from a diffusely reflective surface during the diffuse reflection.

17. The method of claim 15, wherein the light is transmitted through a diffuse media that comprises a solid diffuser, aerosol, colloid, suspension or emulsion.

18. The method of claim 16, wherein the calculation includes solving $\vec{y} = D\vec{x}$ s.t. $\|\vec{x}\|_0 = K$, where: (a) each entry of vector $\vec{y}$ represents measured amplitude and phase at a position on the diffusely reflective surface; (b) each entry of vector $\vec{x}$ is a weight of confidence that a target on the object is at a voxel in a discretized voxel grid consisting of N voxel grid points; (c) there are K targets in the voxel grid; (d) D is a matrix defined as $D=[S(u_1,w_1)\ S(u_2,w_1)\ \ldots\ S(u_R,w_Q)]$, (e) S(u,w) is an operator that takes as input a potential location of a target point on the object and that outputs measurements expected at positions on the diffusely reflective surface; (f) u and w are spatial coordinates of locations on the diffusely reflective surface; and (g) there are R discrete locations on a u-axis and Q discrete locations on a w-axis, such that N=RQ.

19. The method of claim 16, wherein the computer is programmed to estimate a set of points on the diffusely reflective surface that are in the camera's field-of-view and that are each, respectively, closest, out of all points on the diffusely reflective surface, to a corresponding point on the surface of the object.

20. The method of claim 16, wherein the calculation includes solving $\hat{\vec{x}} = D^H \vec{y}$, where: (a) each entry of vector $\vec{y}$ represents measured amplitude and phase at a position on the diffusely reflective surface; (b) each entry of vector $\hat{\vec{x}}$ is a weight of confidence that a target on the object is at a voxel in a discretized voxel grid consisting of N voxel grid points; (c) there are K targets in the voxel grid; (d) D is a matrix defined as $D=[s(u_1,w_1)\ S(u_2,w_1)\ \ldots\ S(u_R,w_Q)]$, (e) S(u,w) is an operator that takes as input a potential location of a target point on the object and that outputs measurements expected at positions on the diffusely reflective surface; (f) u and w are spatial coordinates of locations on the diffusely reflective surface; (g) there are R discrete locations on a u-axis and Q discrete locations on a w-axis, such that N=RQ; and (h) matrix $D^H$ is the conjugate transpose of matrix D.

* * * * *